US012574879B2

(12) United States Patent
Ma et al.

(10) Patent No.: US 12,574,879 B2
(45) Date of Patent: Mar. 10, 2026

(54) GRADUAL FREQUENCY ADJUSTMENT FOR DUAL-LOOP FREQUENCY CONTROL IN NON-TERRESTRIAL NETWORK

(71) Applicant: QUALCOMM Incorporated, San Diego, CA (US)

(72) Inventors: Liangping Ma, San Diego, CA (US); Changhwan Park, San Diego, CA (US); Xiao Feng Wang, San Diego, CA (US); Mohamad Sayed Hassan, Paris (FR); Jun Ma, San Diego, CA (US); Umesh Phuyal, San Diego, CA (US); Peter Gaal, San Diego, CA (US); Huilin Xu, Temecula, CA (US); Harikumar Krishnamurthy, San Diego, CA (US); Bharat Shrestha, San Diego, CA (US); Alberto Rico Alvarino, San Diego, CA (US); Ayan Sengupta, San Diego, CA (US); Lianghai Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 725 days.

(21) Appl. No.: 17/935,851

(22) Filed: Sep. 27, 2022

(65) Prior Publication Data

US 2023/0337161 A1     Oct. 19, 2023

Related U.S. Application Data

(60) Provisional application No. 63/362,974, filed on Apr. 14, 2022.

(51) Int. Cl.
*H04W 56/00* (2009.01)

(52) U.S. Cl.
CPC ... *H04W 56/0045* (2013.01); *H04W 56/0035* (2013.01); *H04W 56/007* (2013.01); *H04W 56/009* (2013.01)

(58) Field of Classification Search
CPC ...................... H04W 4/00–029; H04W 84/06
See application file for complete search history.

(56) References Cited

U.S. PATENT DOCUMENTS

| | | | | |
|---|---|---|---|---|
| 10,194,346 | B2 * | 1/2019 | Forenza | ........... H04W 28/0236 |
| 2020/0186236 | A1 * | 6/2020 | Wang | .................. H04W 52/285 |
| 2022/0038139 | A1 * | 2/2022 | Eriksson Löwenmark | ................. H04W 72/23 |

(Continued)

OTHER PUBLICATIONS

International Search Report and Written Opinion—PCT/US2023/064177—ISA/EPO—Jun. 15, 2023.

(Continued)

*Primary Examiner* — San Htun
(74) *Attorney, Agent, or Firm* — Harrity & Harrity, LLP

(57) ABSTRACT

Various aspects of the present disclosure generally relate to wireless communication. In some aspects, a user equipment (UE) may determine, after an update to a location or a velocity of the UE, a closed-loop frequency pre-compensation and an open-loop frequency pre-compensation. The UE may transmit, after the update to the location or the velocity of the UE, an uplink signal using a frequency pre-compensation that is based at least in part on the closed-loop frequency pre-compensation and the open-loop frequency pre-compensation. Numerous other aspects are described.

30 Claims, 11 Drawing Sheets

(56) References Cited

U.S. PATENT DOCUMENTS

| 2022/0286198 | A1* | 9/2022 | Khan | H04W 56/0035 |
|---|---|---|---|---|
| 2022/0386259 | A1* | 12/2022 | Chen | H04B 7/18563 |
| 2023/0054715 | A1* | 2/2023 | Li | H04B 7/1855 |
| 2023/0254851 | A1* | 8/2023 | Prasad | H04W 72/1268 |
| | | | | 370/316 |
| 2023/0388952 | A1* | 11/2023 | Khoshkholgh Dashtaki | |
| | | | | H04B 7/18513 |

OTHER PUBLICATIONS

Qualcomm Incorporated: "UL Time and Frequency Synchronization for NTN", 3GPP TSG RAN WG1 #106-e, R1-2107342, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, pp. 1-9, XP052033552, paragraph [0003].

* cited by examiner

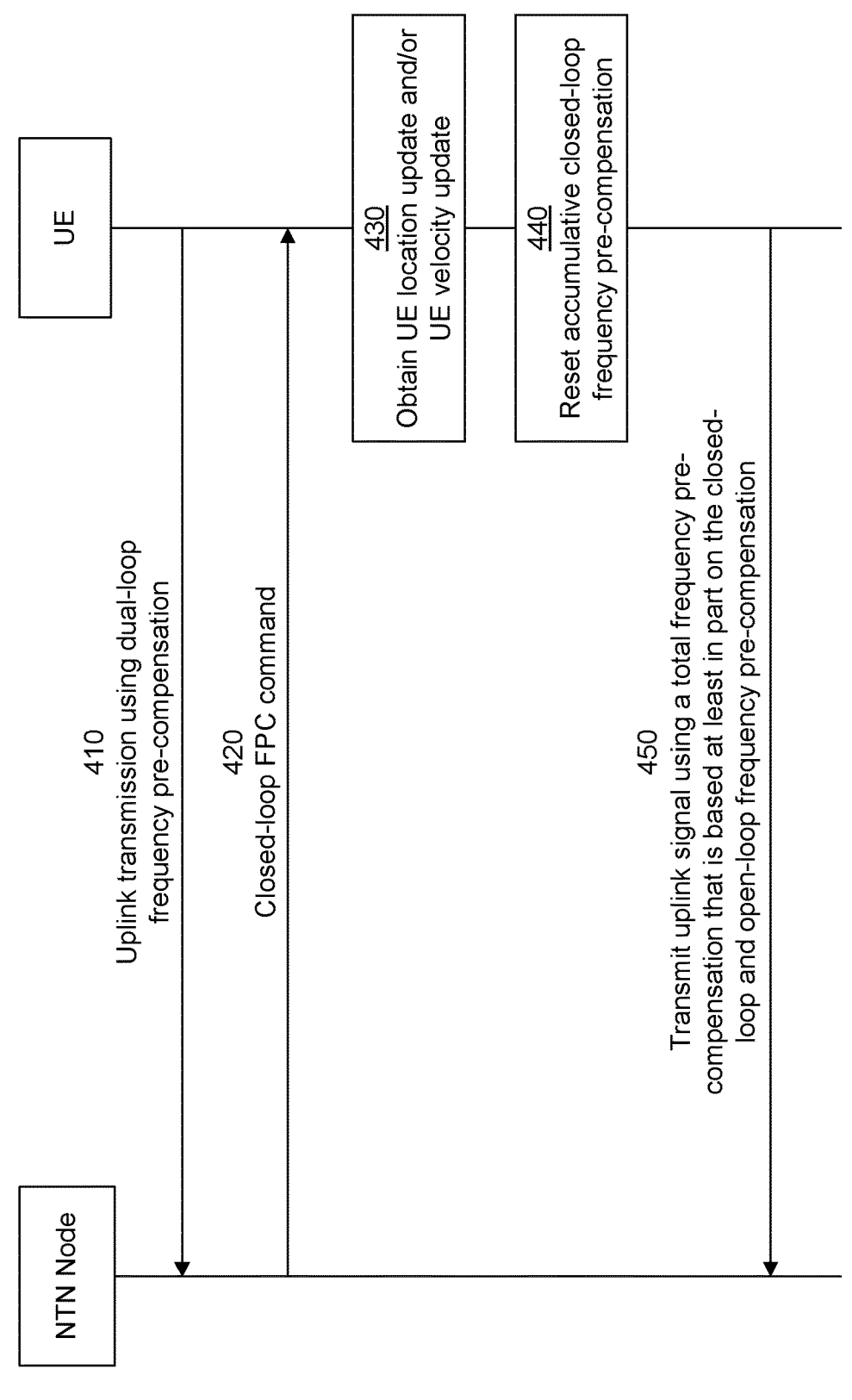

400

UE

NTN Node

410
Uplink transmission using dual-loop
frequency pre-compensation

420
Closed-loop FPC command

430
Obtain UE location update and/or
UE velocity update

440
Reset accumulative closed-loop
frequency pre-compensation

450
Transmit uplink signal using a total frequency pre-
compensation that is based at least in part on the closed-
loop and open-loop frequency pre-compensation

FIG. 4

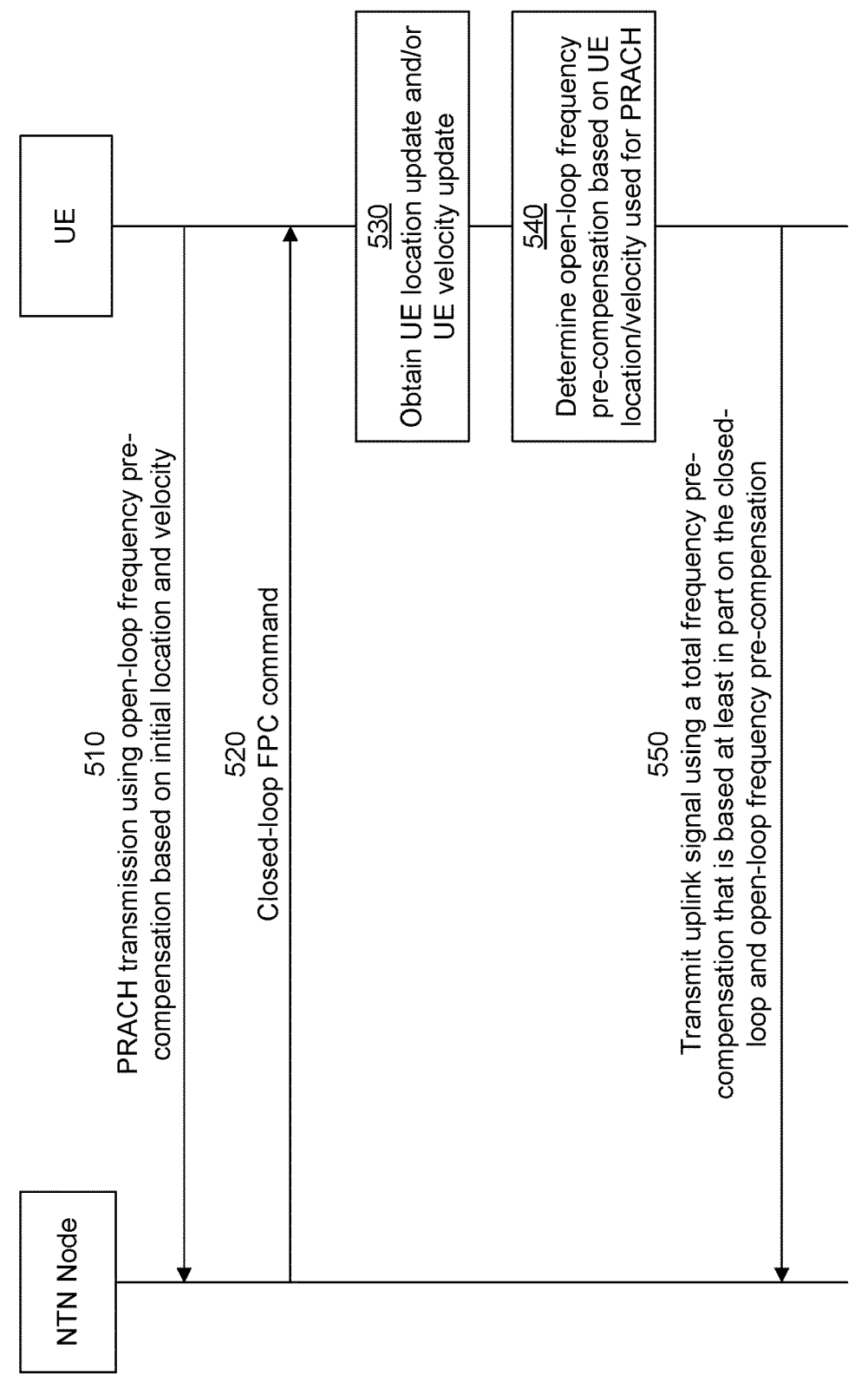

UE

NTN Node

510
PRACH transmission using open-loop frequency pre-compensation based on initial location and velocity 520
Closed-loop FPC command 530
Obtain UE location update and/or UE velocity update 540
Determine open-loop frequency pre-compensation based on UE location/velocity used for PRACH 550
Transmit uplink signal using a total frequency pre-compensation that is based at least in part on the closed-loop and open-loop frequency pre-compensation

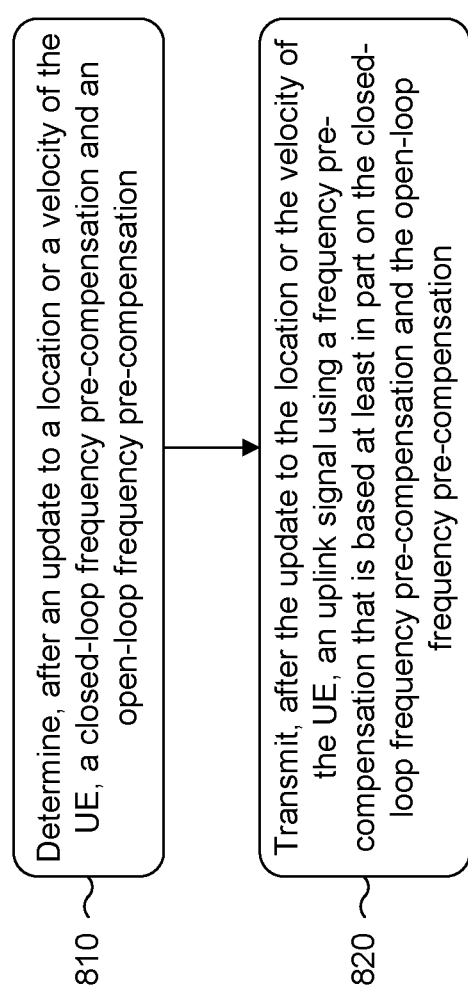

Determine, after an update to a location or a velocity of the UE, a closed-loop frequency pre-compensation and an open-loop frequency pre-compensation

810

Transmit, after the update to the location or the velocity of the UE, an uplink signal using a frequency pre-compensation that is based at least in part on the closed-loop frequency pre-compensation and the open-loop frequency pre-compensation

910    Receive, from a UE, a notification indicating that the UE will be performing a GNSS location update within a time period 920    Adjust control over a closed-loop frequency pre-compensation or a closed-loop timing advance for the UE based at least in part on the GNSS location update

900

GRADUAL FREQUENCY ADJUSTMENT FOR DUAL-LOOP FREQUENCY CONTROL IN NON-TERRESTRIAL NETWORK

CROSS-REFERENCE TO RELATED APPLICATION

This patent application claims priority to U.S. Provisional Patent Application No. 63/362,974, filed on Apr. 14, 2022, entitled "GRADUAL FREQUENCY ADJUSTMENT FOR DUAL-LOOP FREQUENCY CONTROL IN NON-TER-RESTRIAL NETWORK," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses associated with gradual frequency adjustment for dual-loop frequency control in a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to determine, after an update to a location or a velocity of the UE, a closed-loop frequency pre-compensation and an open-loop frequency pre-compensation. The one or more processors may be configured to transmit, after the update to the location or the velocity of the UE, an uplink signal using a frequency pre-compensation that is based at least in part on the closed-loop frequency pre-compensation and the open-loop frequency pre-compensation.

Some aspects described herein relate to a network node for wireless communication. The network node may include a memory and one or more processors coupled to the memory. The one or more processors may be configured to receive, from a UE, a notification indicating that the UE will be performing a global navigation satellite system (GNSS) location update within a time period. The one or more processors may be configured to adjust control over a closed-loop frequency pre-compensation or a closed-loop timing advance for the UE based at least in part on the GNSS location update.

Some aspects described herein relate to a method of wireless communication performed by a UE. The method may include determining, after an update to a location or a velocity of the UE, a closed-loop frequency pre-compensation and an open-loop frequency pre-compensation. The method may include transmitting, after the update to the location or the velocity of the UE, an uplink signal using a frequency pre-compensation that is based at least in part on the closed-loop frequency pre-compensation and the open-loop frequency pre-compensation.

Some aspects described herein relate to a method of wireless communication performed by a network node. The method may include receiving, from a UE, a notification indicating that the UE will be performing a GNSS location update within a time period. The method may include adjusting control over a closed-loop frequency pre-compensation or a closed-loop timing advance for the UE based at least in part on the GNSS location update.

Some aspects described herein relate to a non-transitory computer-readable medium that stores a set of instructions for wireless communication by a UE. The set of instructions, when executed by one or more processors of the UE, may cause the UE to determine, after an update to a location or a velocity of the UE, a closed-loop frequency pre-compensation and an open-loop frequency pre-compensation. The set of instructions, when executed by one or more processors of the UE, may cause the UE to transmit, after the update to the location or the velocity of the UE, an uplink signal using a frequency pre-compensation that is based at least in part on the closed-loop frequency pre-compensation and the open-loop frequency pre-compensation.

Some aspects described herein relate to a non-transitory computer-readable medium that stores a set of instructions for wireless communication by a network node. The set of instructions, when executed by one or more processors of the network node, may cause the network node to receive, from a UE, a notification indicating that the UE will be performing a GNSS location update within a time period. The set of instructions, when executed by one or more processors of the network node, may cause the network node to adjust control over a closed-loop frequency pre-compensation or a closed-loop timing advance for the UE based at least in part on the GNSS location update.

Some aspects described herein relate to an apparatus for wireless communication. The apparatus may include means for determining, after an update to a location or a velocity of the apparatus, a closed-loop frequency pre-compensation and an open-loop frequency pre-compensation. The apparatus may include means for transmitting, after the update to the location or the velocity of the apparatus, an uplink signal using a frequency pre-compensation that is based at least in part on the closed-loop frequency pre-compensation and the open-loop frequency pre-compensation.

Some aspects described herein relate to an apparatus for wireless communication. The apparatus may include means for receiving, from a UE, a notification indicating that the UE will be performing a GNSS location update within a time period. The apparatus may include means for adjusting control over a closed-loop frequency pre-compensation or a closed-loop timing advance for the UE based at least in part on the GNSS location update.

Aspects generally include a method, apparatus, system, computer program product, non-transitory computer-readable medium, user equipment, base station, satellite, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-7 are diagrams illustrating examples associated with gradual frequency adjustment for dual-loop frequency control in an NTN, in accordance with the present disclosure.

FIGS. 8-9 are diagrams illustrating example processes associated with gradual frequency adjustment for dual-loop frequency control in an NTN, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
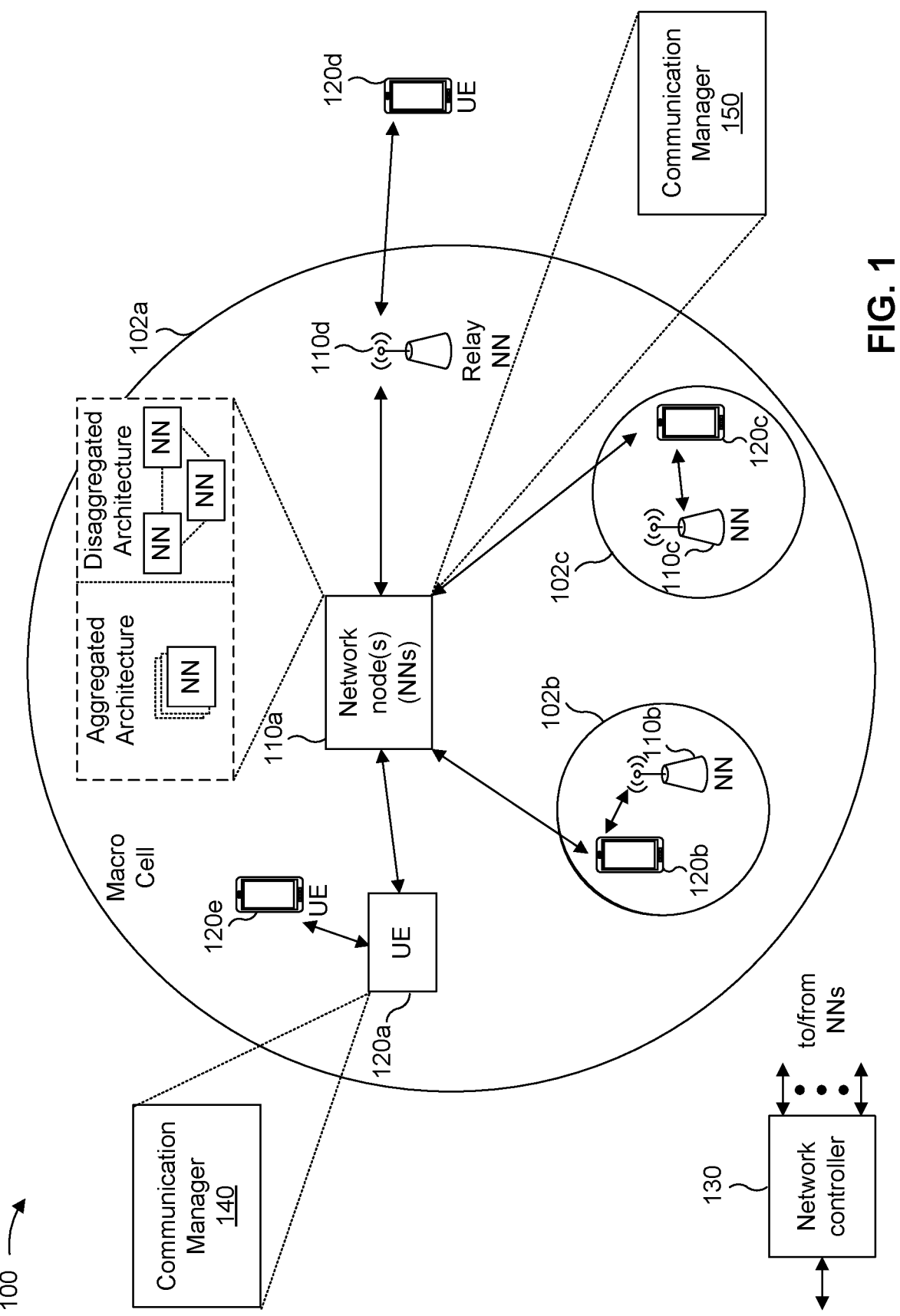
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may determine, after an update to a location or a velocity of the UE 120, a closed-loop frequency pre-compensation and an open-loop frequency pre-compensation; and transmit, after the update to the location or the velocity of the UE 120, an uplink signal using a frequency pre-compensation that is based at least in part on the closed-loop frequency pre-compensation and the open-loop frequency pre-compensation. Additionally, or alternatively, the communication manager 140 may perform one or more other operations described herein.

In some aspects, a network node 110 may include a communication manager 150. As described in more detail elsewhere herein, the communication manager 150 may receive, from a UE 120, a notification indicating that the UE will be performing a global navigation satellite system (GNSS) location update within a time period; and adjust control over a closed-loop frequency pre-compensation or a closed-loop timing advance for the UE 120 based at least in part on the GNSS location update. Additionally, or alternatively, the communication manager 150 may perform one or more other operations described herein.

As indicated above, FIG. 1 is provided as an example. Other examples may differ from what is described with regard to FIG. 1.

Figure 2:
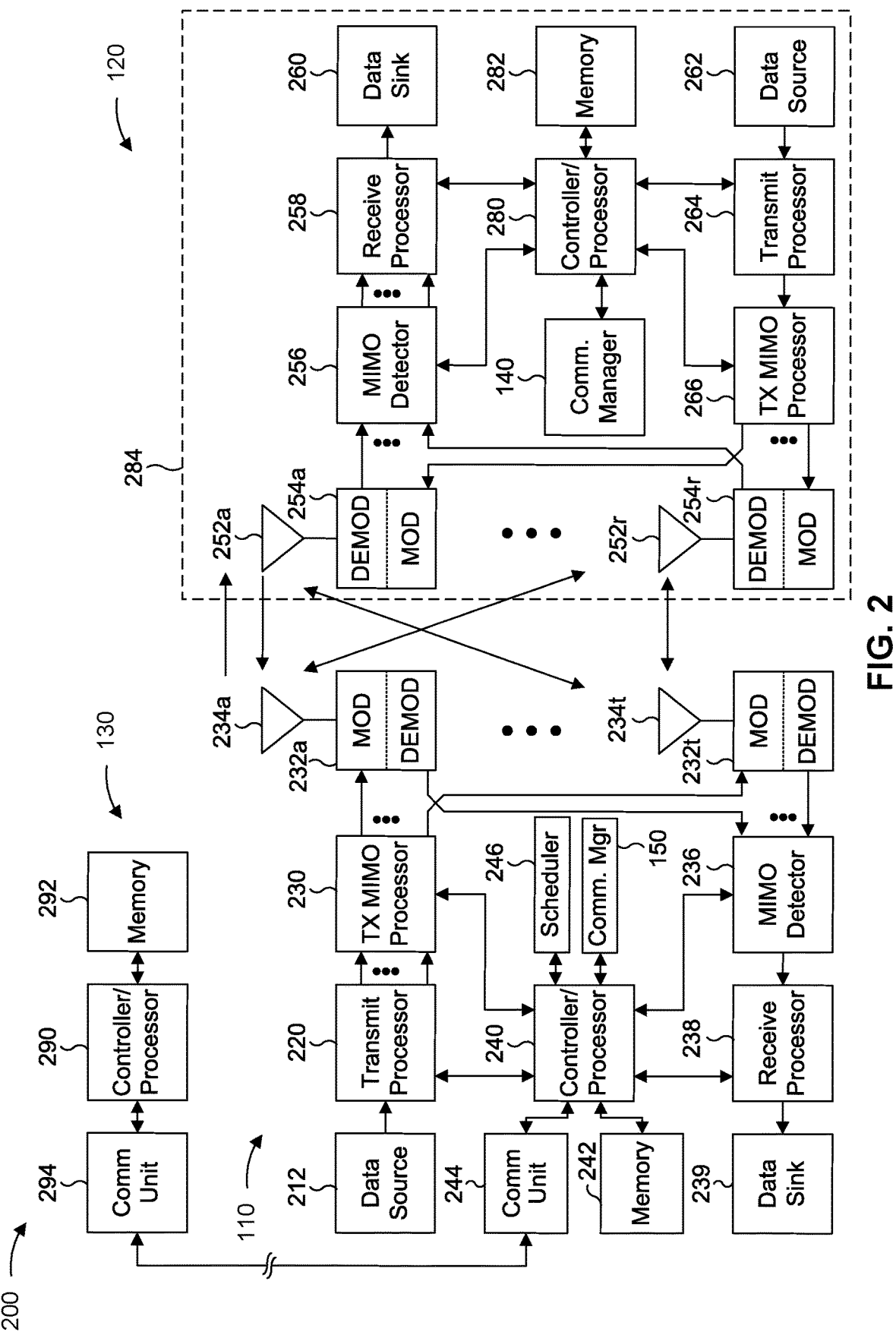
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with gradual frequency adjustment for dual-loop frequency control in an NTN, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for determining, after an update to a location or a velocity of the UE 120, a closed-loop frequency pre-compensation and an open-loop frequency pre-compensation; and/or means for transmitting, after the update to the location or the velocity of the UE 120, an uplink signal using a frequency pre-compensation that is based at least in part on the closed-loop frequency pre-compensation and the open-loop frequency pre-compensation. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving, from a UE 120, a notification indicating that the UE 120 will be performing a GNSS location update within a time period; and/or means for adjusting control over a closed-loop frequency pre-compensation or a closed-loop timing advance for the UE 120 based at least in part on the GNSS location update. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
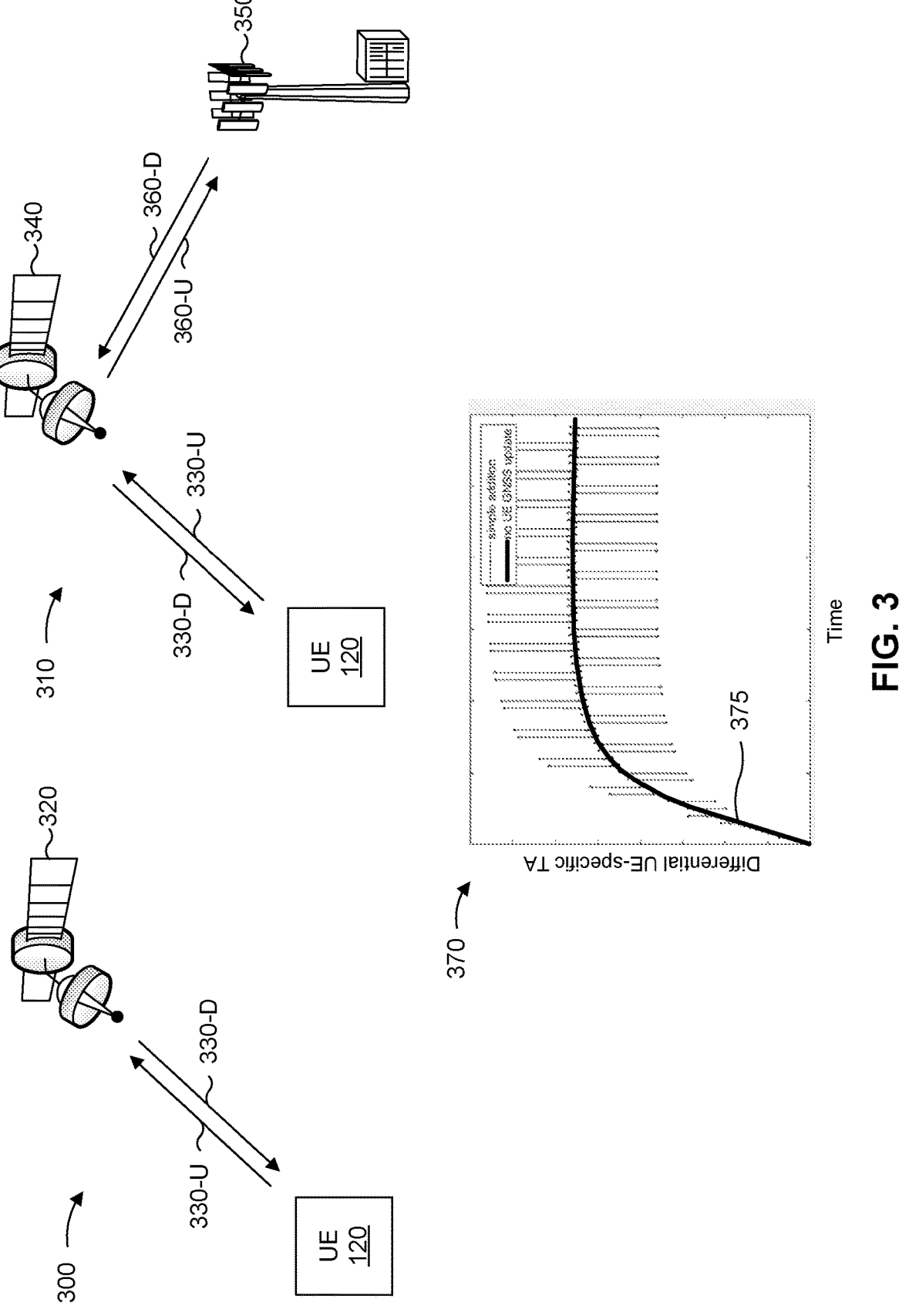
FIG. 3 is a diagram illustrating an example of a regenerative satellite deployment and an example of a transparent satellite deployment in a non-terrestrial network (NTN).

FIG. 3 is a diagram illustrating an example 300 of a regenerative satellite deployment and an example 310 of a transparent satellite deployment in a non-terrestrial network (NTN).

Example 300 shows a regenerative satellite deployment in an NTN. In example 300, a UE 120 is served by a satellite 320 via a service link 330. For example, the satellite 320 may include a base station or a network node (e.g., a CU, a DU, an RU, and/or any suitable combination thereof). The satellite 320 may be referred to as a non-terrestrial base station, a regenerative repeater, and/or an on-board processing repeater, among other examples. The satellite 320 may demodulate an uplink radio frequency (RF) signal and may modulate a baseband signal derived from the uplink RF signal to produce a downlink RF transmission. The satellite 320 may transmit the downlink RF signal to the UE 120 on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from a gateway 350 via a feeder link 360. For example, the satellite 340 may receive an RF transmission from the gateway 350 via the feeder link 360 and may relay the RF transmission to the UE 120 via the service link 330 without demodulating the RF transmission. Additionally, or alternatively, the satellite 340 may receive an RF transmission from the UE 120 via the service link 330 and may relay the RF transmission to the gateway 350 via the feeder link 360 without demodulating the RF transmission. The satellite 340 may frequency convert the RF transmission(s) received on the service link 330 to a frequency of the RF transmission(s) on the feeder link 360 (or vice versa) and may amplify and/or filter the relayed RF transmission(s). The UEs 120 shown in example 300 and example 310 may be associated with a GNSS capability or a Global Positioning System (GPS) capability, though not all UEs have such capabilities. The satellite 340 may provide a cell that covers the UE 120.

As shown in FIG. 3, the service link 330 may include a link between the satellite 320/340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120). As shown in FIG. 3, an uplink of the service link 330 is indicated by reference number 330-U and a downlink of the service link 330 is indicated by reference number 330-D. Similarly, an uplink of the feeder link 360 is indicated by reference number 360-U and a downlink of the feeder link 360 is indicated by reference number 360-D.

The feeder link 360 and the service link 330 in an NTN may each experience Doppler effects due to the movement of the satellites 320 and 340, and potentially movement of a UE 120. The Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency. In addition, as described in further detail herein, an NTN may employ frequency synchronization to pre-compensate for a Doppler shift or Doppler effect on the service link 330, which may be influenced or caused by factors such as a change in a location of the UE 120 and/or a change in a velocity of the UE 120. Furthermore, due to the long distance between the UE 120 and satellite 320/340, communication in an NTN may be associated with a much longer delay (e.g., a longer latency and/or a longer round-trip time (RTT)) than a delay associated with a terrestrial network. The delay may be even greater in a transparent satellite deployment because any communication between the UE 120 and the gateway 350 must travel over the service link 330 and the feeder link 360, each of which may associated with a longer delay than a terrestrial network. Accordingly, in some cases, dual-loop (e.g., a combination of open-loop and closed-loop) timing synchronization may be employed for a UE 120 operating in an NTN.

More particularly, as described above, an NTN deployment may be associated with long delays (e.g., a long latency and/or a long RTT) relative to a terrestrial network due at least in part to the long distance between the UE 120 and the NTN node (e.g., satellite 320/340). Furthermore, the delay in a transparent satellite deployment may exceed the delay in a regenerative satellite deployment because any communication between the UE 120 and a gateway 350 or other network node travels from the UE 120 to the NTN node over a service link and then from the NTN node to the gateway 350 or other network node over a feeder link, where both the service link and the feeder link may be associated with a longer delay than a terrestrial network. Accordingly, in an NTN, a UE 120 may generally apply a timing advance (TA) to an uplink transmission performed in a radio resource control (RRC) idle or inactive state and/or an uplink transmission performed in an RRC connected state. For example, the TA applied by the UE 120 may have a value that corresponds to a length of time that a signal takes to travel from the serving network node to the UE 120 and back to the serving network node (which may be included in the NTN node in a regenerative satellite deployment or a gateway in a transparent satellite deployment). For example, the TA applied by the UE 120 may correspond to an RTT between the serving network node and the UE 120 because the TA is relative to a downlink frame at the UE 120, which is already a single-trip delay relative to the same downlink frame at the serving network node. In this way, the TA applied by the UE 120 may align uplink reception timing implemented at the serving network node to enable communication with different UEs 120 that may be located at various distances from the serving network node. For example, the TA that a UE 120 applies when performing an uplink transmission in an NTN, $T_{TA}$, may be given by:

$$T_{TA} = (N_{TA} + N_{TA,UE\text{-}specific} + N_{TA,common} + N_{TA,offset}) \times T_c$$

In the above expression, $N_{TA}$ is a closed-loop timing offset between uplink and downlink radio frames at the UE 120. For example, the closed-loop timing offset may be defined as zero (0) for a physical random access channel (PRACH) transmission that occurs before the UE 120 has established an RRC connection, and the closed-loop timing offset value may then be updated based at least in part on a TA command field in msg2 in a four-step random access channel (RACH) procedure, a TA command field in msgB in a two-step RACH procedure, and/or a medium access control (MAC) control element (MAC-CE) TA command, among other examples. Furthermore, the parameter $N_{TA,UE\text{-}specific}$ represents an open-loop UE-specific TA that is self-estimated by the UE 120 to pre-compensate for a service link delay, the parameter $N_{TA,common}$ is a network-controlled common TA that includes any timing offsets that may be considered necessary by the NTN, the parameter $N_{TA,offset}$ is a fixed timing advance offset that the UE 120 uses to calculate the TA applied to an uplink transmission, and $T_c$ is a timing unit defined as $1/(480,000 \times 4096)$ seconds, or 0.509 nanoseconds. In some cases, however, the open-loop UE-specific TA, $N_{TA,UE\text{-}specific}$, may potentially cause problems such as increased uplink reception timing error at the serving network node.

For example, the UE 120 may self-estimate the open-loop UE-specific TA based at least in part on a location of the UE 120 and a satellite location (e.g., a location of the NTN node), where the location of the UE 120 may be estimated based at least in part on a current or most recent GNSS location fix, which the UE 120 may update every few seconds (e.g., in 10 second intervals). Accordingly, during the interval between GNSS location fixes, the UE location that the UE 120 uses to calculate the UE-specific TA may be inaccurate (e.g., when the UE 120 is in motion). In some cases, the inaccuracy in the UE location used to calculate the UE-specific TA may be corrected in the closed-loop timing offset (e.g., the serving network node may measure the uplink reception timing error and transmit a TA command that indicates the closed-loop timing offset to be used to calculate the overall TA that the UE 120 is to apply for an uplink transmission). As a result, when the UE 120 calculates a new open-loop UE-specific TA following an updated GNSS location fix, the new open-loop UE-specific TA may correct for a change in the UE location even though the error in the UE location may have already been corrected by the closed-loop timing offset. This may cause a double correction problem, whereby the TA that the UE 120 applies to an uplink transmission after updating a GNSS location fix is calculated based at least in part on the closed-loop timing offset and the open-loop UE-specific TA both correcting for an error in the UE location. For example, in FIG. 3, graph 370 illustrates how updated GNSS location fixes can result in abrupt changes in uplink timing (shown as spikes relative to curve 375, which represents the change to the UE-specific TA (e.g., in a time interval of 0.1 second) in a scenario where the UE 120 does not update a GNSS location fix such that there is no double correction in the overall TA calculated by the UE 120). The abrupt changes that occur when the UE 120 obtains updated GNSS location fixes may lead to spikes or jumps in uplink reception timing error at a serving network node in an NTN.

Accordingly, in some cases, a UE 120 may apply TA slew rate control to mitigate spikes or jumps in uplink reception timing error at a serving network node in an NTN (e.g., to mitigate double correction that may occur when the UE 120 calculates an updated UE-specific TA following an updated GNSS location fix). For example, applying slew rate control to the open-loop UE-specific TA may be unsuitable because the open-loop UE-specific TA can change at a rate up to 50 microseconds per second (e.g., based at least in part on a satellite moving at a velocity around 7000 meters per second), which is too fast because wireless communication standards currently only support adjusting the UE-specific TA at a maximum rate of 0.895 microseconds per second for FR1 or a maximum rate of 0.407 microseconds per second for FR2. Accordingly, to address the double correction issue, the UE may apply slew rate control to a differential UE-specific TA, which may be based at least in part on a difference between a first UE-specific TA calculated for a current GNSS location fix and a second UE-specific TA calculated for a previous GNSS location fix. For example, the UE 120 may apply slew rate control by gradually adjusting the UE-specific TA after updating a GNSS location fix. Additionally, or alternatively, the UE 120 may apply slew rate control by gradually adjusting the UE location that is used to calculate the UE-specific TA after the UE updates a GNSS location fix. Additionally, or alternatively, the UE 120 may avoid double correction in cases where a closed-loop TA command is received and one or more GNSS location fixes are updated between consecutive uplink transmissions by discounting the UE location error that has already been corrected by the closed-loop TA command. In this way, the UE 120 may transmit an uplink message at a time that is based at least in part on the differential UE-specific TA with the slew rate control applied. For example, as described herein, the uplink message may be transmitted to the NTN node using a TA that is calculated based at least in part on an open-loop UE-specific TA that does not change abruptly when the UE 120 updates a GNSS location fix, which may reduce errors in uplink reception timing at the serving network node.

Furthermore, a similar double correction issue may occur in cases where an NTN uses dual-loop (e.g., open-loop and closed-loop) frequency synchronization to pre-compensate for a frequency error on the service link 330. For example, in cases where open-loop frequency synchronization is enabled on the service link 330, a UE 120 may self-estimate a frequency synchronization error on the service link 330 based on a location and a velocity of the UE 120 and a location and a velocity of the satellite 320/340. Accordingly, the UE 120 may transmit an uplink signal on the service link 330 by applying an open-loop frequency pre-compensation based on the frequency synchronization error that is estimated from the location and velocity of the UE 120 and the location and velocity of the satellite 320/340. Closed-loop frequency synchronization may also be beneficial in an NTN because the closed-loop frequency synchronization enables the NTN to provide feedback to control the frequency error. For example, when closed-loop frequency synchronization is enabled, a node in the NTN (e.g., a satellite 320/340, gateway 350, and/or other serving network node) may detect or measure an uplink frequency synchronization error on the service link 330, and a frequency pre-compensation (FPC) command may be transmitted to the UE 120 to correct the uplink frequency synchronization error when the uplink frequency synchronization satisfies (e.g., equals or exceeds) a threshold. However, when open-loop and closed-loop frequency synchronization are used in combination, the double correction issue can occur when the UE 120 updates a stale GNSS location fix and/or otherwise obtains an update to a location and/or a velocity of the UE 120. For example, when dual-loop uplink frequency synchronization is used, a total frequency pre-compensation that the UE 120 applies to an uplink transmission, F, may be defined as:

$$F=F_{closed}+F_{open}+F_{offset}$$

In the above expression, F is the total frequency pre-compensation applied to an uplink transmission, where the total frequency pre-compensation applied to an uplink transmission generally refers to an increase or a decrease to a transmission frequency to correct for frequency synchronization errors caused by a Doppler shift that is influenced by respective locations and velocities of the UE 120 and the satellite 320/340. More particularly, in the above expression, $F_{closed}$ is a closed-loop frequency pre-compensation defined as zero (0) for a PRACH transmission and a value of which may be updated based at least in part on an FPC command field in msg2 in a four-step random access procedure, an FPC command in msgB in a two-step random access procedure, and/or an FPC command carried in a MAC-CE. Furthermore, the parameter $F_{open}$ represents an open-loop frequency pre-compensation that is self-estimated by the UE 120 based on the location and velocity of the UE 120 (e.g., determined using a GNSS receiver and/or inertial sensors) and the location and velocity of the satellite 320/340 (e.g., determined from ephemeris information), and the parameter $F_{offset}$ is a fixed frequency offset that may be set to zero (0) or a non-zero value. When applying dual-loop uplink frequency synchronization, the UE 120 may apply the total frequency pre-compensation in a digital part of a transmit chain (e.g., adjusting one or more OFDM tones) and/or in an analog part of the transmit chain (e.g., adjusting a phase locked loop (PLL)). In either case, because dual-loop uplink frequency synchronization is used to correct for a Doppler shift that may be influenced based on a change in a location of the UE 120 and/or a change in the velocity of the UE 120, the double correction issue may arise when both the open-loop and closed-loop frequency pre-compensation values are updated after an update to the location of the UE 120 and/or an update to the velocity of the UE 120.

For example, when the UE 120 obtains the update to the location and/or velocity of the UE 120 (e.g., from a new GNSS fix and/or a new location and/or velocity reading from an inertial sensor), the UE 120 may use the ephemeris information to determine the location and velocity of the satellite, which are used to calculate a Doppler shift and determine the open-loop frequency pre-compensation needed to compensate for the Doppler shift. However, the UE 120 may be unable to continually obtain new GNSS fixes, which generally require a few seconds, whereby a frequency error associated with uplink transmissions may increase in the time between GNSS fixes as the previous location and/or velocity becomes outdated. The closed-loop frequency pre-compensation can therefore be used to correct the frequency error that accumulates between GNSS fixes, which can result in double correction when the UE 120 recalculates the open-loop frequency pre-compensation after obtaining the correct location and velocity of the UE 120 after an update to the UE location and/or velocity.

Accordingly, some aspects described herein relate to a gradual frequency adjustment that may be used for dual-loop frequency control in an NTN (e.g., to mitigate double correction that may otherwise occur when a UE 120 obtains an updated location and/or velocity that may change an open-loop frequency pre-compensation value). For example, as described in further detail below with reference to FIG. 4, the UE 120 may reset an accumulative closed-loop frequency pre-compensation after obtaining an update to a location and/or a velocity of the UE 120 and/or may reset the accumulative closed-loop frequency pre-compensation when one or more conditions are satisfied. Alternatively, as described in further detail below with reference to FIG. 5, in cases where the UE 120 performs a PRACH transmission using an open-loop frequency pre-compensation that is based on an initial location and velocity of the UE 120 (e.g., at a time of the PRACH transmission), the UE 120 may ignore any location and/or velocity updates when calculating the open-loop frequency pre-compensation after the PRACH transmission. Alternatively, as described in further detail below with reference to FIG. 6, the UE 120 may avoid double correction in cases where one or more closed-loop FPC commands are received and the location and/or velocity of the UE 120 are updated between consecutive uplink transmissions by discounting the frequency error that has already been corrected by the closed-loop FPC command(s). Furthermore, as described in further detail below with reference to FIG. 7, the UE 120 may transmit a notification to a node in the NTN to indicate that a GNSS location update will be performed, which may allow the NTN node to adjust control over closed-loop timing synchronization and/or closed-loop frequency synchronization to avoid or mitigate double correction issues.

As indicated above, FIG. 3 is provided as an example. Other examples may differ from what is described with regard to FIG. 3.

FIG. 4 is a diagram illustrating an example 400 associated with gradual frequency adjustment for dual-loop frequency control in an NTN, in accordance with the present disclosure. As shown in FIG. 4, example 400 includes communication between a UE (e.g., UE 120) and an NTN node (e.g., a regenerative satellite 320 that includes a network node 110 and/or a transparent satellite 340 that relays communications between the UE and a gateway 350, among other examples). In some aspects, the UE and the NTN node may be included in a wireless network, such as wireless network 100, which may be and/or may include an NTN in which one or more satellites or other non-terrestrial flying objects are deployed. In some aspects, the UE and the NTN node may communicate via a wireless service link, which may include an uplink (e.g., service link 330-U) and a downlink (e.g., service link 330-D).

In some aspects, as shown by reference number 410, the UE may transmit, to the NTN node, an uplink signal using dual-loop frequency pre-compensation. In particular, as described herein, dual-loop frequency pre-compensation may include a combination of closed-loop frequency pre-compensation controlled by the NTN node or another network node (e.g., a gateway, a CU, a DU, an RU, and/or any suitable combination thereof) in communication with the NTN node and open-loop frequency pre-compensation that is self-estimated by the UE. In some aspects, the UE may self-estimate the open-loop frequency pre-compensation based on a current location and a current velocity of the UE, which may be determined from one or more GNSS position fixes, measurements from inertial sensors of the UE, or the like, and further based on a current location and a current velocity of the NTN node, which may be determined from ephemeris information provided to the UE. Furthermore, in cases where the UE performed one or more previous uplink transmissions, the uplink signal may be transmitted with a closed-loop frequency pre-compensation that is added to the self-estimated open-loop frequency pre-compensation.

For example, the NTN node may detect the uplink frequency synchronization error(s) associated with the previous uplink transmission(s) and provide one or more FPC commands to the UE to correct the uplink frequency synchronization error(s) (e.g., based on the uplink frequency synchronization error(s) equaling, exceeding, or otherwise satisfying a threshold). For example, the FPC command(s) may indicate an increase or a decrease to the closed-loop frequency pre-compensation value, whereby the FPC commands provided to the UE may be accumulated over time to indicate the closed-loop frequency pre-compensation that the UE is to apply to an uplink transmission. Accordingly, as described herein, the UE may perform the uplink transmission with dual-loop frequency pre-compensation, where a total frequency pre-compensation applied to the uplink transmission, F, is a sum of the accumulative closed-loop frequency pre-compensation and the open-loop frequency pre-compensation that is self-estimated by the UE. In some aspects, a fixed frequency offset may optionally be added to the accumulative closed-loop frequency pre-compensation and the open-loop frequency pre-compensation self-estimated by the UE.

As shown by reference number 420, the NTN node may transmit an FPC command to the UE to update the value of the closed-loop frequency pre-compensation to be applied by the UE. For example, when the uplink transmission performed by the UE arrives at the NTN node, the NTN node may estimate a frequency synchronization error that may be attributed to a Doppler shift caused by changes in respective locations and velocities of the UE and the NTN node. Accordingly, in cases where the estimated frequency synchronization error satisfies a threshold, the NTN node may transmit the FPC command (e.g., in a MAC-CE) to update the closed-loop frequency pre-compensation applied by the UE and correct the estimated frequency synchronization error (e.g., caused by a change in a location and/or a velocity of the UE).

As further shown by reference number 430, the UE may obtain an update to a location of the UE and/or a velocity of the UE. For example, in some aspects, the UE may obtain an updated location through a new GNSS position fix, may obtain an updated location and/or velocity from an updated inertial sensor reading, or the like. Accordingly, in some aspects, the UE may determine that the open-loop frequency pre-compensation is to be updated based on the updated location and/or velocity of the UE. However, in cases where the UE receives one or more FPC commands to update the accumulative closed-loop frequency pre-compensation applied by the UE, the accumulative closed-loop frequency pre-compensation may have already corrected for the change in the location and/or velocity of the UE. Accordingly, in some aspects, as shown by reference number 440, the UE may reset a value of the accumulative closed-loop frequency pre-compensation to zero (0). In some aspects, the UE may reset a value of the accumulative closed-loop frequency pre-compensation after the update to the location and/or velocity of the UE, or the UE may reset a value of the accumulative closed-loop frequency pre-compensation based on one or more conditions being satisfied. For example, in some aspects, the UE may reset a value of the accumulative closed-loop frequency pre-compensation based on a change in the velocity of the UE satisfying a first threshold, based on a change in the location of the UE satisfying a second threshold, based on an elapsed time from a last reset of the closed-loop frequency pre-compensation satisfying a third threshold, and/or any combination thereof. In some aspects, the various thresholds may be configured by the NTN node in cell-specific signaling (e.g., a system information block (SIB)) or in UE-specific or dedicated signaling UE (e.g., RRC signaling or a MAC-CE). Furthermore, in some aspects, the NTN node may determine values of one or more of the thresholds based on assistance information provided by the UE (e.g., information indicating that the update to the location and/or velocity of the UE will be performed).

Accordingly, as shown by reference number 450, the UE may transmit an uplink signal to the NTN node using a total frequency pre-compensation, F, that is a sum of the closed-loop frequency pre-compensation, $F_{closed}$, the open-loop frequency pre-compensation, $F_{open}$, and an optional fixed frequency offset, $F_{offset}$, that may be set to zero or a non-zero value. For example, after obtaining the update to the location and/or velocity of the UE, the UE may recalculate the open-loop frequency pre-compensation based on the current (e.g., updated or most recent) location and velocity of the UE and the current location and velocity of the NTN node (e.g., at the time of the update to the location and/or velocity of the UE). Furthermore, as described above, the UE may reset the accumulative closed-loop frequency pre-compensation to zero, whereby the closed-loop frequency pre-compensation does not contribute to the total frequency pre-compensation applied to the uplink signal transmitted to the NTN node. In other words, although the total frequency pre-compensation is a sum of at least the closed-loop frequency pre-compensation and the open-loop frequency pre-compensation, a value of the total frequency pre-compensation applied to the uplink signal transmitted to the NTN node is equal to the value of only the open-loop frequency pre-compensation that is self-estimated by the UE or a value of the self-estimated open-loop frequency pre-compensation added to the value of the fixed frequency offset. In this way, by resetting the closed-loop frequency pre-compensation (e.g., after the update to the location and/or velocity of the UE and/or when one or more conditions are satisfied), double correction of the frequency pre-compensation applied by the UE may be avoided.

As indicated above, FIG. 4 is provided as an example. Other examples may differ from what is described with regard to FIG. 4.

FIG. 5 is a diagram illustrating an example 500 associated with gradual frequency adjustment for dual-loop frequency control in an NTN, in accordance with the present disclosure. As shown in FIG. 5, example 500 includes communication between a UE (e.g., UE 120) and an NTN node (e.g., a regenerative satellite 320 that includes a network node 110 and/or a transparent satellite 340 that relays communications between the UE and a gateway 350, among other examples). In some aspects, the UE and the NTN node may be included in a wireless network, such as wireless network 100, which may be and/or may include an NTN in which one or more satellites or other non-terrestrial flying objects are deployed. In some aspects, the UE and the NTN node may communicate via a wireless service link, which may include an uplink (e.g., service link 330-U) and a downlink (e.g., service link 330-D).

In some aspects, as shown by reference number 510, the UE may transmit, to the NTN node, a PRACH transmission using dual-loop frequency pre-compensation. In particular, as described herein, dual-loop frequency pre-compensation may include a combination of closed-loop frequency pre-compensation controlled by the NTN node or another network node (e.g., a gateway, a CU, a DU, an RU, and/or any suitable combination thereof) in communication with the NTN node and open-loop frequency pre-compensation that is self-estimated by the UE. However, in the case of a PRACH transmission that occurs before the UE has synchronized to the timing and/or frequency of the NTN node, the UE would not have received any FPC commands to correct for frequency synchronization errors detected at the NTN node. Accordingly, when performing the PRACH transmission, the UE may self-estimate an open-loop frequency pre-compensation based on first values for a location and a velocity of the UE and a location and a velocity of the NTN node (e.g., at a time of the PRACH transmission), and the closed-loop frequency pre-compensation that is added to the self-estimated open-loop frequency pre-compensation may be set to zero.

As further shown by reference number 520, the NTN node may transmit a closed-loop FPC command to the UE based on a frequency synchronization error associated with the PRACH transmission. For example, the FPC command may be provided in msg2 of a four-step RACH procedure or msgB of a two-step RACH procedure following the PRACH transmission, and the FPC command may indicate an increase or a decrease to the closed-loop frequency pre-compensation value.

As further shown by reference number 530, the UE may obtain an update to a location of the UE and/or a velocity of the UE. For example, in some aspects, the UE may obtain an updated location through a new GNSS position fix, may obtain an updated location and/or velocity from an updated inertial sensor reading, or the like. Accordingly, in some aspects, the UE may determine that the open-loop frequency pre-compensation is to be updated based on the updated location and/or velocity of the UE. However, in cases where the UE receives the FPC command in msg2/msgB to update the closed-loop frequency pre-compensation applied by the UE, the closed-loop frequency pre-compensation may have already corrected for the change in the location and/or velocity of the UE. Accordingly, as shown by reference number 540, the UE may determine the updated value of the open-loop frequency pre-compensation after the PRACH transmission based on the first values for the location and the velocity of the UE (e.g., the values that were used to calculate the open-loop frequency pre-compensation for the PRACH transmission). For example, after the update to the location and/or velocity of the UE, the UE may calculate an updated open-loop frequency pre-compensation based on the first values for the location and velocity of the UE (e.g., effectively ignoring the change in the location and/or velocity of the UE after the PRACH transmission) and a current location and velocity of the NTN node (e.g., the UE may only update the location and velocity of the NTN node, which are determined based on the ephemeris information for the NTN node). In addition, the UE may determine the value of the closed-loop frequency pre-compensation based on the FPC command(s) received from the NTN node.

Accordingly, as shown by reference number 550, the UE may transmit an uplink signal to the NTN node using a total frequency pre-compensation, F, that is a sum of the closed-loop frequency pre-compensation, $F_{closed}$, the open-loop frequency pre-compensation, $F_{open}$, and an optional fixed frequency offset, $F_{offset}$, that may be set to zero or a non-zero value. For example, after obtaining the update to the location and/or velocity of the UE, the UE may recalculate the open-loop frequency pre-compensation based on the first values for the location and the velocity of the UE (e.g., no change to the location or velocity since the PRACH transmission) and the current location and velocity of the NTN node (e.g., at the time of the update to the location and/or velocity of the UE). Furthermore, as described above, the UE receives one or more FPC commands from the NTN node that are accumulated to determine the value of the closed-loop frequency pre-compensation. In this way, ignoring the update or change to the location of the UE when recalculating the open-loop frequency pre-compensation may avoid the double correction issue that may occur when the closed-loop frequency pre-compensation (e.g., indicated in the FPC command) has already corrected for the location/velocity change.

As indicated above, FIG. 5 is provided as an example. Other examples may differ from what is described with regard to FIG. 5.

Figure 6:
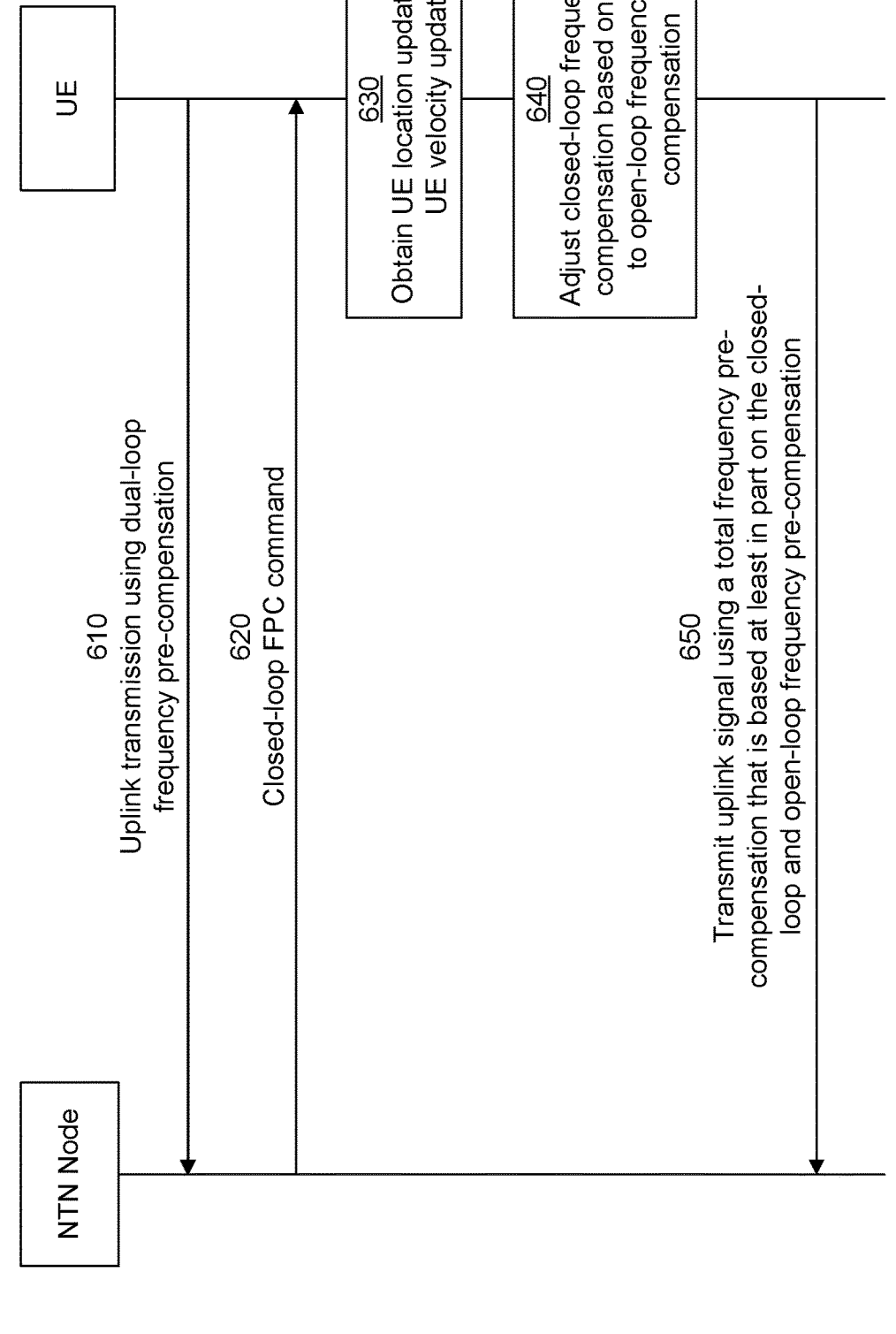

FIG. 6 is a diagram illustrating an example 600 associated with gradual frequency adjustment for dual-loop frequency control in an NTN, in accordance with the present disclosure. As shown in FIG. 6, example 600 includes communication between a UE (e.g., UE 120) and an NTN node (e.g., a regenerative satellite 320 that includes a network node 110 and/or a transparent satellite 340 that relays communications between the UE and a gateway 350, among other examples). In some aspects, the UE and the NTN node may be included in a wireless network, such as wireless network 100, which may be and/or may include an NTN in which one or more satellites or other non-terrestrial flying objects are deployed. In some aspects, the UE and the NTN node may communicate via a wireless service link, which may include an uplink (e.g., service link 330-U) and a downlink (e.g., service link 330-D).

In some aspects, as shown by reference number 610, the UE may transmit, to the NTN node, an uplink signal using dual-loop frequency pre-compensation. In particular, as described herein, dual-loop frequency pre-compensation may include a combination of closed-loop frequency pre-compensation controlled by the NTN node or another network node (e.g., a gateway, a CU, a DU, an RU, and/or any suitable combination thereof) in communication with the NTN node and open-loop frequency pre-compensation that is self-estimated by the UE. In some aspects, the UE may self-estimate the open-loop frequency pre-compensation based on a current location and a current velocity of the UE, which may be determined from one or more GNSS position fixes, measurements from inertial sensors of the UE, or the like, and further based on a current location and a current velocity of the NTN node, which may be determined from ephemeris information provided to the UE. Furthermore, in cases where the UE performed one or more previous uplink transmissions, the uplink signal may be transmitted with a closed-loop frequency pre-compensation that is added to the self-estimated open-loop frequency pre-compensation.

For example, the NTN node may detect the uplink frequency synchronization error(s) associated with the previous uplink transmission(s) and provide one or more FPC commands to the UE to correct the uplink frequency synchronization error(s) (e.g., based on the uplink frequency synchronization error(s) equaling, exceeding, or otherwise satisfying a threshold). For example, the FPC command(s) may indicate an increase or a decrease to the closed-loop frequency pre-compensation value, whereby the FPC commands provided to the UE may be accumulated over time to indicate the closed-loop frequency pre-compensation that the UE is to apply to an uplink transmission. Accordingly, as described herein, the UE may perform the uplink transmission with dual-loop frequency pre-compensation, where a total frequency pre-compensation applied to the uplink transmission, F, is a sum of the accumulative closed-loop frequency pre-compensation and the open-loop frequency pre-compensation that is self-estimated by the UE. In some aspects, a fixed frequency offset may optionally be added to the accumulative closed-loop frequency pre-compensation and the open-loop frequency pre-compensation self-esti-mated by the UE.

As shown by reference number 620, the NTN node may transmit an FPC command to the UE to update the value of the closed-loop frequency pre-compensation to be applied by the UE. For example, when the uplink transmission performed by the UE arrives at the NTN node, the NTN node may estimate a frequency synchronization error that may be attributed to a Doppler shift caused by changes in respective locations and velocities of the UE and the NTN node. Accordingly, in cases where the estimated frequency synchronization error satisfies a threshold, the NTN node may transmit the FPC command (e.g., in a MAC-CE) to update the closed-loop frequency pre-compensation applied by the UE and correct the estimated frequency synchroni-zation error (e.g., caused by a change in a location and/or a velocity of the UE).

As further shown by reference number 630, the UE may obtain an update to a location of the UE and/or a velocity of the UE. For example, in some aspects, the UE may obtain an updated location through a new GNSS position fix, may obtain an updated location and/or velocity from an updated inertial sensor reading, or the like. Accordingly, in some aspects, the UE may determine that the open-loop frequency pre-compensation is to be updated based on the updated location and/or velocity of the UE. However, in cases where the UE receives one or more FPC commands to update the accumulative closed-loop frequency pre-compensation applied by the UE, the accumulative closed-loop frequency pre-compensation may have already corrected for the change in the location and/or velocity of the UE. Accord-ingly, in some aspects, as shown by reference number 640, the UE may adjust the closed-loop frequency pre-compen-sation value based on a change to the open-loop frequency pre-compensation. For example, as described herein, the UE may adjust the closed-loop frequency pre-compensation value based on a change to the open-loop frequency pre-compensation that is caused by the update to the location and/or velocity of the UE.

For example, at a time of the update to the location and/or velocity of the UE, the UE may calculate a change to the open-loop frequency pre-compensation, which may be determined by computing $F_{change}=F_{open,new}-F_{open,old}$, where $F_{open,new}$ is the UE self-estimated frequency pre-compensa-tion based on the current location and velocity of the UE and the current location and velocity of the NTN node, and where $F_{open,old}$ is the UE self-estimated frequency pre-compensation based on the previous location and velocity of the UE and the current location and velocity of the NTN node. Accordingly, the UE may then subtract the change in the open-loop frequency pre-compensation from the closed-loop frequency pre-compensation, whereby $F_{closed}=F_{closed}-F_{change}$. In general, subtracting the full change in the open-loop frequency pre-compensation from the closed-loop frequency pre-compensation in the manner described above may be most suitable for cases where the closed-loop frequency pre-compensation has fully corrected the fre-quency synchronization error. However, in some cases, the closed-loop frequency pre-compensation may have cor-rected only a portion of the frequency synchronization error (e.g., in cases where there have not been enough FPC commands between consecutive updates to the location and/or velocity of the UE to correct all of the frequency synchronization error). Accordingly, in some aspects, the UE may subtract a fraction or a portion of the change in the open-loop frequency pre-compensation from the closed-loop frequency pre-compensation (e.g., a fraction or portion that has already been corrected by the closed-loop frequency pre-compensation control loop). In this case, the UE may estimate the fraction x of the change in the open-loop frequency pre-compensation that has been corrected by the closed-loop frequency pre-compensation (e.g., $x \in [0, 1]$), and may then subtract the fractional change in the open-loop frequency pre-compensation from the closed-loop frequency pre-compensation such that $F_{closed}=F_{closed}-X(F_{change})$. In either case, as shown by reference number 650, the UE may transmit an uplink signal to the NTN node using the total frequency pre-compensation, F, which the UE may compute using the formula $F=F_{closed}+F_{open}+F_{offset}$ after appropriately adjusting the value of $F_{closed}$ based on the change to $F_{open}$ that is caused by the update to the location and/or velocity of the UE.

As indicated above, FIG. 6 is provided as an example. Other examples may differ from what is described with regard to FIG. 6.

Figure 7:
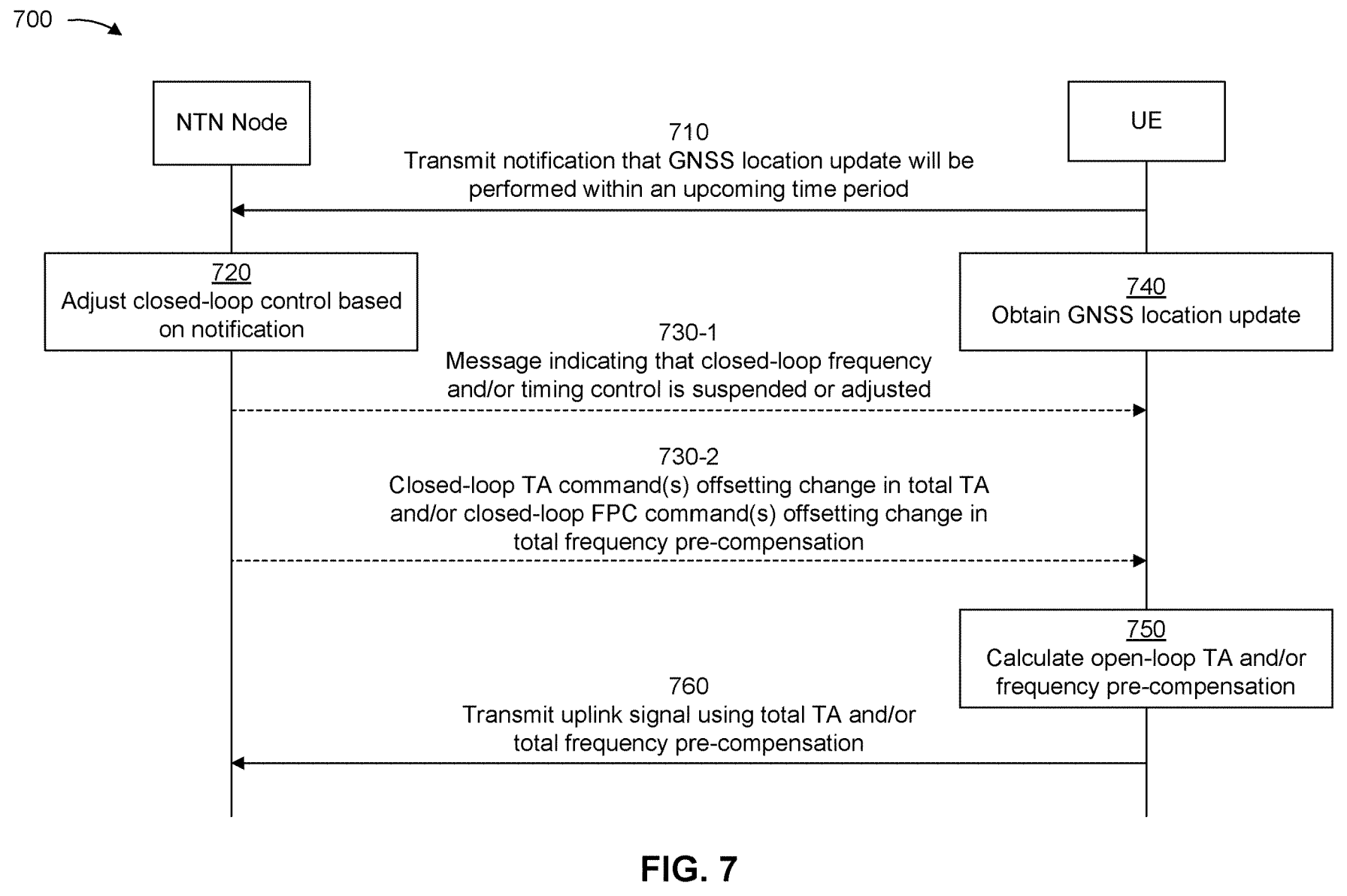

FIG. 7 is a diagram illustrating an example 700 associated with gradual frequency adjustment for dual-loop frequency control in an NTN, in accordance with the present disclo-sure. As shown in FIG. 7, example 700 includes communi-cation between a UE (e.g., UE 120) and an NTN node (e.g., a regenerative satellite 320 that includes a network node 110 and/or a transparent satellite 340 that relays communications between the UE and a gateway 350, among other examples). In some aspects, the UE and the NTN node may be included in a wireless network, such as wireless network 100, which may be and/or may include an NTN in which one or more satellites or other non-terrestrial flying objects are deployed. In some aspects, the UE and the NTN node may commu-nicate via a wireless service link, which may include an uplink (e.g., service link 330-U) and a downlink (e.g., service link 330-D).

As shown in FIG. 7, and by reference number 710, the UE may transmit a notification to the NTN node to indicate that the UE will perform a GNSS location update within a time period. For example, in some aspects, the notification may be transmitted to the NTN node in a MAC-CE, an RRC message, or another suitable message within a time period prior to the GNSS location update (e.g., a number of milliseconds, subframes, or frames before the GNSS loca-tion update). Accordingly, the NTN node may use the notification of the impending GNSS location update to adjust closed-loop synchronization control for the UE. For example, as described herein, an update to a GNSS location of the UE may potentially lead to a double correction in a timing advance that the UE applies to an uplink transmission when dual-loop timing synchronization is used on the ser-vice link, and an update to a GNSS location or a velocity of the UE may potentially lead to a double correction in a frequency pre-compensation that the UE applies to an uplink transmission when dual-loop frequency synchronization is used on the service link.

Accordingly, as shown by reference number 720, the NTN node may adjust closed-loop timing control and/or closed-loop frequency control based on the notification that the UE will be performing a GNSS location update in order to mitigate or prevent synchronization errors that may result from double correction of the timing advance and/or fre-quency pre-compensation applied by the UE. For example, in some aspects, the NTN node may suspend closed-loop timing control and/or closed-loop frequency control after the GNSS location to avoid double correction that may otherwise occur if closed-loop and open-loop synchronization parameters were both updated to correct for the change in the location of the UE. In such cases, as shown by reference number 730-1, the NTN node may transmit, to the UE, a message indicating that closed-loop timing control and/or closed-loop frequency control is suspended. Additionally, or alternatively, as shown by reference number 730-2, the NTN node may adjust one or more closed-loop synchronization commands to offset a change that the GNSS location update causes for the corresponding open-loop synchronization parameters. For example, in some aspects, the NTN node may adjust one or more closed-loop timing advance commands that are transmitted to the UE to offset a change in the total timing advance applied by the UE (e.g., based on a record of one or more TA commands previously sent to the UE) and/or may adjust one or more closed-loop FPC commands that are transmitted to the UE to offset a change in the total frequency pre-compensation applied by the UE (e.g., based on a record of one or more FPC commands previously sent to the UE).

As shown by reference number 740, the UE may obtain the GNSS location update. As further shown by reference number 750, the UE may calculate an open-loop timing advance and/or an open-loop frequency pre-compensation based at least in part on the updated GNSS location. For example, in some aspects, the UE may calculate the open-loop timing advance based on the updated GNSS location of the UE and the location of the NTN node at the time of the GNSS location update, and/or may calculate the open-loop frequency pre-compensation based on the Doppler shift that is self-estimated based on the updated GNSS location of the UE, the velocity of the UE at the time of the GNSS location update, the location of the NTN node at the time of the GNSS location update, and the velocity of the NTN node at the time of the GNSS location update. As shown by reference number 760, the UE may transmit an uplink signal to the NTN node using a total timing advance and/or a total frequency pre-compensation. For example, the total timing advance may be based on only the self-estimated open-loop timing advance in cases where closed-loop timing control is suspended, or the total timing advance may be based on a sum of the self-estimated open-loop timing advance and the accumulative timing advance command(s) received from the NTN node in cases where the closed-loop timing advance commands are adjusted to offset the change in the total timing advance applied by the UE. In a similar manner, the total frequency pre-compensation applied to the uplink signal may be based on only the self-estimated open-loop frequency pre-compensation in cases where closed-loop frequency control is suspended, or the total frequency pre-compensation may be based on a sum of the self-estimated open-loop frequency pre-compensation and the accumulative FPC command(s) received from the NTN node in cases where the closed-loop frequency pre-compensation commands are adjusted to offset the change in the total frequency pre-compensation applied by the UE.

As indicated above, FIG. 7 is provided as an example. Other examples may differ from what is described with regard to FIG. 7.

FIG. 8 is a diagram illustrating an example process 800 performed, for example, by a UE, in accordance with the present disclosure. Example process 800 is an example where the UE (e.g., UE 120) performs operations associated with gradual frequency adjustment for dual-loop frequency control in an NTN.

As shown in FIG. 8, in some aspects, process 800 may include determining, after an update to a location or a velocity of the UE, a closed-loop frequency pre-compensation and an open-loop frequency pre-compensation (block 810). For example, the UE (e.g., using communication manager 140 and/or frequency pre-compensation component 1008, depicted in FIG. 10) may determine, after an update to a location or a velocity of the UE, a closed-loop frequency pre-compensation and an open-loop frequency pre-compensation, as described above.

As further shown in FIG. 8, in some aspects, process 800 may include transmitting, after the update to the location or the velocity of the UE, an uplink signal using a frequency pre-compensation that is based at least in part on the closed-loop frequency pre-compensation and the open-loop frequency pre-compensation (block 820). For example, the UE (e.g., using communication manager 140 and/or transmission component 1004, depicted in FIG. 10) may transmit, after the update to the location or the velocity of the UE, an uplink signal using a frequency pre-compensation that is based at least in part on the closed-loop frequency pre-compensation and the open-loop frequency pre-compensation, as described above.

Process 800 may include additional aspects, such as any single aspect or any combination of aspects described below and/or in connection with one or more other processes described elsewhere herein.

In a first aspect, determining the closed-loop frequency pre-compensation includes resetting the closed-loop frequency pre-compensation to zero.

In a second aspect, alone or in combination with the first aspect, the closed-loop frequency pre-compensation is reset to zero after the update to the location or the velocity of the UE.

In a third aspect, alone or in combination with one or more of the first and second aspects, the closed-loop frequency pre-compensation is reset to zero based at least in part on one or more conditions being satisfied.

In a fourth aspect, alone or in combination with one or more of the first through third aspects, the one or more conditions include one or more of a change to the location of the UE satisfying a first threshold, a change to the velocity of the UE satisfying a second threshold, or an elapsed time since a most recent reset of the closed-loop frequency pre-compensation satisfying a third threshold.

In a fifth aspect, alone or in combination with one or more of the first through fourth aspects, one or more of the first threshold, the second threshold, or the third threshold are configured in cell-specific or UE-specific signaling.

In a sixth aspect, alone or in combination with one or more of the first through fifth aspects, determining the closed-loop frequency pre-compensation and the open-loop frequency pre-compensation includes determining that a PRACH was previously transmitted using a value for the open-loop frequency pre-compensation that was based on first values for the location and the velocity of the UE, calculating the open-loop frequency pre-compensation according to the first values for the location and the velocity of the UE and current values for a satellite location and a satellite velocity, and calculating the closed-loop frequency pre-compensation according to one or more frequency pre-compensation commands received from a network node.

In a seventh aspect, alone or in combination with one or more of the first through sixth aspects, determining the closed-loop frequency pre-compensation and the open-loop frequency pre-compensation includes calculating, at a time of the update to the location or the velocity of the UE, a change to the open-loop frequency pre-compensation caused by the update to the location or the velocity of the UE, and subtracting the change to the open-loop frequency pre-compensation from the closed-loop frequency pre-compensation.

In an eighth aspect, alone or in combination with one or more of the first through seventh aspects, determining the closed-loop frequency pre-compensation and the open-loop frequency pre-compensation includes calculating, at a time of the update to the location or the velocity of the UE, a change to the open-loop frequency pre-compensation caused by the update to the location or the velocity of the UE, estimating a fraction of the change to the open-loop frequency pre-compensation that has been corrected by one or more frequency pre-compensation commands received from a network node, and subtracting the estimated fraction of the change to the open-loop frequency pre-compensation from the closed-loop frequency pre-compensation.

In a ninth aspect, alone or in combination with one or more of the first through eighth aspects, process 800 includes transmitting, to a network node, a notification indicating that a GNSS location update will be performed within a time period.

In a tenth aspect, alone or in combination with one or more of the first through ninth aspects, process 800 includes receiving, from the network node, an indication that control over one or more of the closed-loop frequency pre-compensation or a closed-loop timing advance is suspended based at least in part on the notification.

In an eleventh aspect, alone or in combination with one or more of the first through tenth aspects, process 800 includes receiving, from the network node, one or more closed-loop timing advance or frequency pre-compensation commands that offset a change in a total timing advance or a total frequency pre-compensation caused by the GNSS location update.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
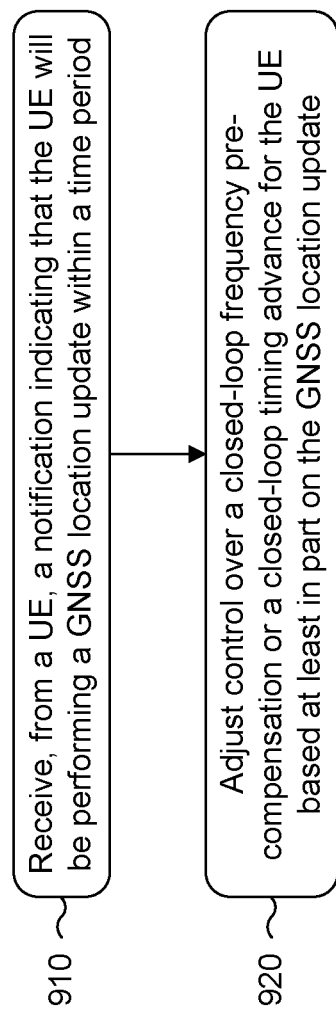

FIG. 9 is a diagram illustrating an example process 900 performed, for example, by a network node, in accordance with the present disclosure. Example process 900 is an example where the network node (e.g., network node 110, satellite 320, gateway 350, or the like) performs operations associated with gradual frequency adjustment for dual-loop frequency control in an NTN.

As shown in FIG. 9, in some aspects, process 900 may include receiving, from a UE, a notification indicating that the UE will be performing a GNSS location update within a time period (block 910). For example, the network node (e.g., using communication manager 150 and/or reception component 1102, depicted in FIG. 11) may receive, from a UE, a notification indicating that the UE will be performing a GNSS location update within a time period, as described above.

As further shown in FIG. 9, in some aspects, process 900 may include adjusting control over a closed-loop frequency pre-compensation or a closed-loop timing advance for the UE based at least in part on the GNSS location update (block 920). For example, the network node (e.g., using communication manager 150 and/or closed-loop control component

Figure 11:
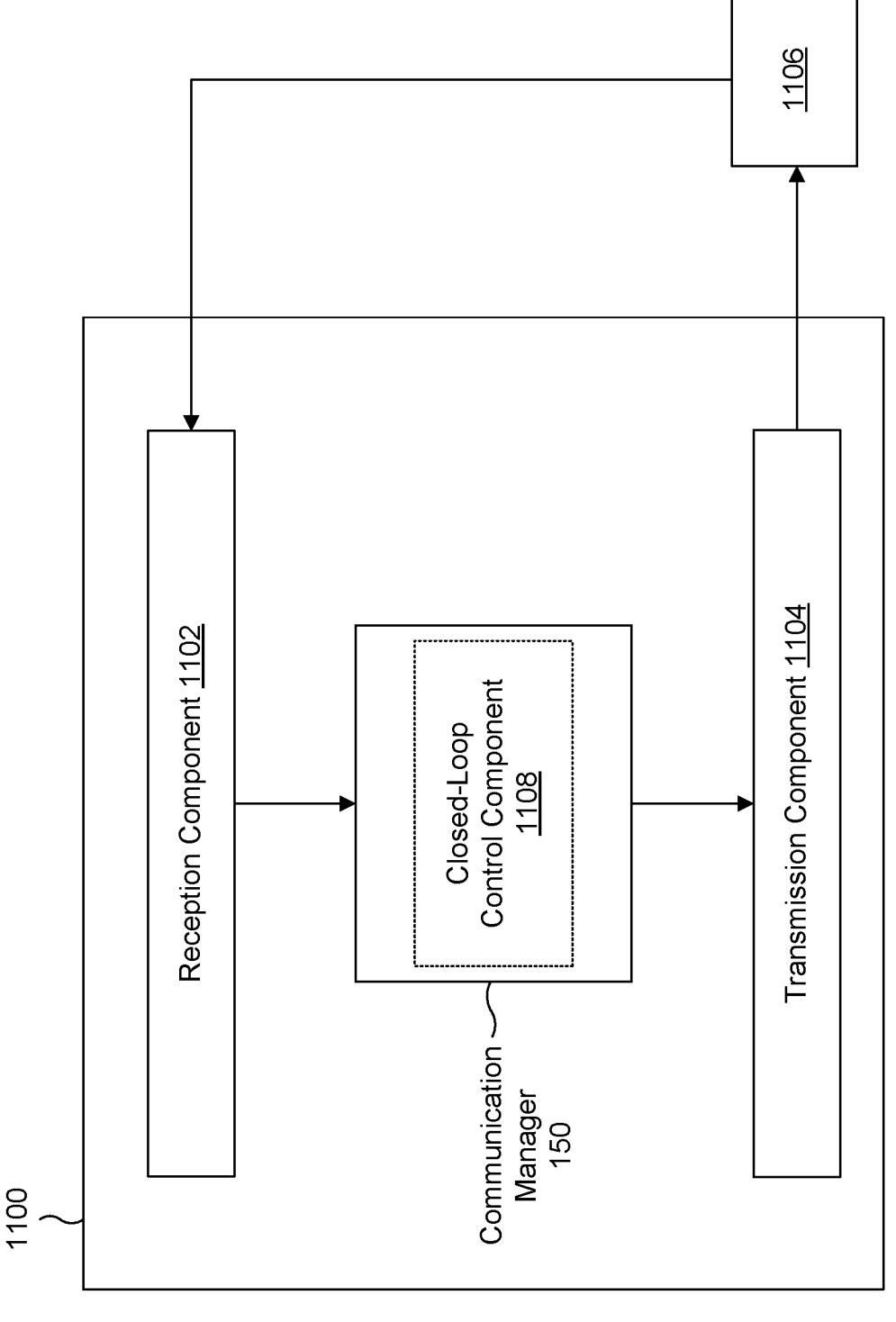

1108, depicted in FIG. 11) may adjust control over a closed-loop frequency pre-compensation or a closed-loop timing advance for the UE based at least in part on the GNSS location update, as described above.

Process 900 may include additional aspects, such as any single aspect or any combination of aspects described below and/or in connection with one or more other processes described elsewhere herein.

In a first aspect, adjusting control over the closed-loop frequency pre-compensation or the closed-loop timing advance includes suspending the closed-loop frequency pre-compensation or the closed-loop timing advance based at least in part on the notification.

In a second aspect, alone or in combination with the first aspect, process 900 includes transmitting, to the UE, an indication that control over the closed-loop frequency pre-compensation or the closed-loop timing advance is suspended.

In a third aspect, alone or in combination with one or more of the first and second aspects, adjusting control over the closed-loop timing advance includes estimating a change in a total timing advance associated with the UE that is caused by the GNSS location update, and transmitting, to the UE, a closed-loop timing advance command to offset the change in the total timing advance that is caused by the GNSS location update, wherein the closed-loop timing advance command has a value that is based at least in part on one or more past closed-loop timing advance commands for the UE.

In a fourth aspect, alone or in combination with one or more of the first through third aspects, adjusting control over the closed-loop frequency pre-compensation includes estimating a change in a total frequency pre-compensation associated with the UE that is caused by the GNSS location update, and transmitting, to the UE, a closed-loop frequency pre-compensation command to offset the change in the total frequency pre-compensation that is caused by the GNSS location update, wherein the closed-loop frequency pre-compensation command has a value that is based at least in part on one or more past closed-loop frequency pre-compensation commands for the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
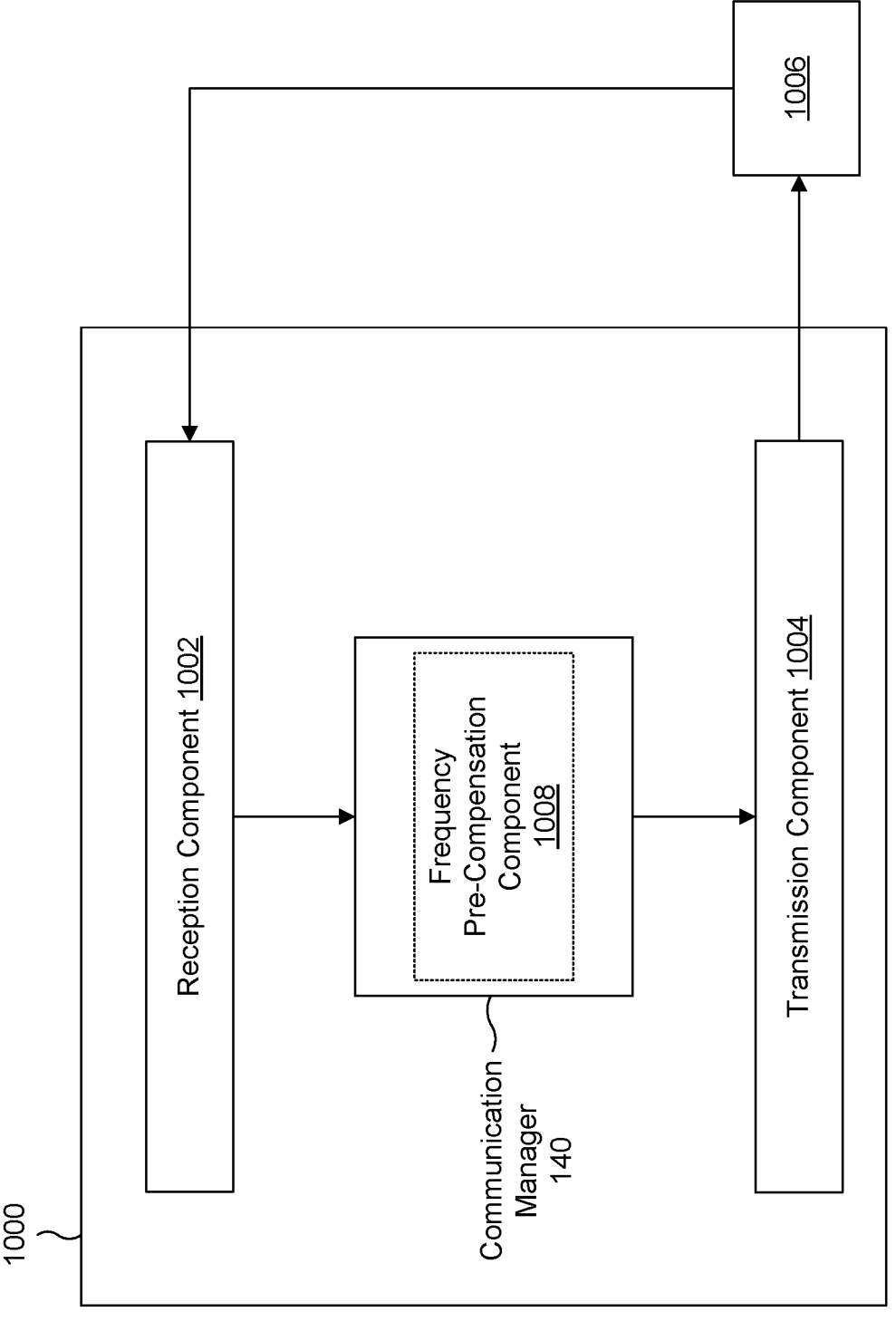
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 140. The communication manager 140 may include a frequency pre-compensation component 1008, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8.

In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The frequency pre-compensation component 1008 may determine, after an update to a location or a velocity of the UE, a closed-loop frequency pre-compensation and an open-loop frequency pre-compensation. The transmission component 1004 may transmit, after the update to the location or the velocity of the UE, an uplink signal using a frequency pre-compensation that is based at least in part on the closed-loop frequency pre-compensation and the open-loop frequency pre-compensation.

The transmission component 1004 may transmit, to a network node, a notification indicating that a GNSS location update will be performed within a time period.

The reception component 1002 may receive, from the network node, an indication that control over one or more of the closed-loop frequency pre-compensation or a closed-loop timing advance is suspended based at least in part on the notification.

The reception component 1002 may receive, from the network node, one or more closed-loop timing advance or frequency pre-compensation commands that offset a change in a total timing advance or a total frequency pre-compensation caused by the GNSS location update.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network node, or another wireless communication device) using the reception component 1102 and the transmission component 1104. As further shown, the apparatus 1100 may include the communication manager 150. The communication manager 150 may include a closed-loop control component 1108, among other examples.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive, from a UE, a notification indicating that the UE will be performing a GNSS location update within a time period. The closed-loop control component 1108 may adjust control over a closed-loop frequency pre-compensation or a closed-loop timing advance for the UE based at least in part on the GNSS location update.

The transmission component 1104 may transmit, to UE, an indication that control over the closed-loop frequency pre-compensation or the closed-loop timing advance is suspended.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: determining, after an update to a location or a velocity of the UE, a closed-loop frequency pre-compensation and an open-loop frequency pre-compensation; and transmitting, after the update to the location or the velocity of the UE, an uplink signal using a frequency pre-compensation that is based at least in part on the closed-loop frequency pre-compensation and the open-loop frequency pre-compensation.

Aspect 2: The method of Aspect 1, wherein determining the closed-loop frequency pre-compensation includes resetting the closed-loop frequency pre-compensation to zero.

Aspect 3: The method of Aspect 2, wherein the closed-loop frequency pre-compensation is reset to zero after the update to the location or the velocity of the UE.

Aspect 4: The method of any of Aspects 2-3, wherein the closed-loop frequency pre-compensation is reset to zero based at least in part on one or more conditions being satisfied.

Aspect 5: The method of Aspect 4, wherein the one or more conditions include one or more of a change to the location of the UE satisfying a first threshold, a change to the velocity of the UE satisfying a second threshold, or an elapsed time since a most recent reset of the closed-loop frequency pre-compensation satisfying a third threshold.

Aspect 6: The method of Aspect 5, wherein one or more of the first threshold, the second threshold, or the third threshold are configured in cell-specific or UE-specific signaling.

Aspect 7: The method of Aspect 1, wherein determining the closed-loop frequency pre-compensation and the open-loop frequency pre-compensation includes: determining that a PRACH was previously transmitted using a value for the open-loop frequency pre-compensation that was based on first values for the location and the velocity of the UE; calculating the open-loop frequency pre-compensation according to the first values for the location and the velocity of the UE and current values for a satellite location and a satellite velocity; and calculating the closed-loop frequency pre-compensation according to one or more frequency pre-compensation commands received from a network node.

Aspect 8: The method of Aspect 1, wherein determining the closed-loop frequency pre-compensation and the open-loop frequency pre-compensation includes: calculating, at a time of the update to the location or the velocity of the UE, a change to the open-loop frequency pre-compensation caused by the update to the location or the velocity of the UE; and subtracting the change to the open-loop frequency pre-compensation from the closed-loop frequency pre-compensation.

Aspect 9: The method of Aspect 1, wherein determining the closed-loop frequency pre-compensation and the open-loop frequency pre-compensation includes: calculating, at a time of the update to the location or the velocity of the UE, a change to the open-loop frequency pre-compensation caused by the update to the location or the velocity of the UE; estimating a fraction of the change to the open-loop frequency pre-compensation that has been corrected by one or more frequency pre-compensation commands received from a network node; and subtracting the estimated fraction of the change to the open-loop frequency pre-compensation from the closed-loop frequency pre-compensation.

Aspect 10: The method of any of Aspects 1-9, further comprising: transmitting, to a network node, a notification indicating that a GNSS location update will be performed within a time period.

Aspect 11: The method of Aspect 10, further comprising: receiving, from the network node, an indication that control over one or more of the closed-loop frequency pre-compensation or a closed-loop timing advance is suspended based at least in part on the notification.

Aspect 12: The method of any of Aspects 10-11, further comprising: receiving, from the network node, one or more closed-loop timing advance or frequency pre-compensation commands that offset a change in a total timing advance or a total frequency pre-compensation caused by the GNSS location update.

Aspect 13: A method of wireless communication performed by a network node, comprising: receiving, from a UE, a notification indicating that the UE will be performing a GNSS location update within a time period; and adjusting control over a closed-loop frequency pre-compensation or a closed-loop timing advance for the UE based at least in part on the GNSS location update.

Aspect 14: The method of Aspect 13, wherein adjusting control over the closed-loop frequency pre-compensation or the closed-loop timing advance includes suspending the closed-loop frequency pre-compensation or the closed-loop timing advance based at least in part on the notification.

Aspect 15: The method of Aspect 14, further comprising: transmitting, to the UE, an indication that control over the closed-loop frequency pre-compensation or the closed-loop timing advance is suspended.

Aspect 16: The method of any of Aspects 13-15, wherein adjusting control over the closed-loop timing advance includes: estimating a change in a total timing advance associated with the UE that is caused by the GNSS location update; and transmitting, to the UE, a closed-loop timing advance command to offset the change in the total timing advance that is caused by the GNSS location update, wherein the closed-loop timing advance command has a value that is based at least in part on one or more past closed-loop timing advance commands for the UE.

Aspect 17: The method of any of Aspects 13-16, wherein adjusting control over the closed-loop frequency pre-compensation includes: estimating a change in a total frequency pre-compensation associated with the UE that is caused by the GNSS location update; and transmitting, to the UE, a closed-loop frequency pre-compensation command to offset the change in the total frequency pre-compensation that is caused by the GNSS location update, wherein the closed-loop frequency pre-compensation command has a value that is based at least in part on one or more past closed-loop frequency pre-compensation commands for the UE.

Aspect 18: An apparatus for wireless communication at a device, comprising a processor; memory coupled with the processor; and instructions stored in the memory and executable by the processor to cause the apparatus to perform the method of one or more of Aspects 1-12.

Aspect 19: A device for wireless communication, comprising a memory and one or more processors coupled to the memory, the one or more processors configured to perform the method of one or more of Aspects 1-12.

Aspect 20: An apparatus for wireless communication, comprising at least one means for performing the method of one or more of Aspects 1-12.

Aspect 21: A non-transitory computer-readable medium storing code for wireless communication, the code comprising instructions executable by a processor to perform the method of one or more of Aspects 1-12.

Aspect 22: A non-transitory computer-readable medium storing a set of instructions for wireless communication, the set of instructions comprising one or more instructions that, when executed by one or more processors of a device, cause the device to perform the method of one or more of Aspects 1-12.

Aspect 23: An apparatus for wireless communication at a device, comprising a processor; memory coupled with the processor; and instructions stored in the memory and executable by the processor to cause the apparatus to perform the method of one or more of Aspects 13-17.

Aspect 24: A device for wireless communication, comprising a memory and one or more processors coupled to the memory, the one or more processors configured to perform the method of one or more of Aspects 13-17.

Aspect 25: An apparatus for wireless communication, comprising at least one means for performing the method of one or more of Aspects 13-17.

Aspect 26: A non-transitory computer-readable medium storing code for wireless communication, the code comprising instructions executable by a processor to perform the method of one or more of Aspects 13-17.

Aspect 27: A non-transitory computer-readable medium storing a set of instructions for wireless communication, the set of instructions comprising one or more instructions that, when executed by one or more processors of a device, cause the device to perform the method of one or more of Aspects 13-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
one or more memories; and
one or more processors, coupled to the one or more memories, configured to:
receive one or more frequency pre-compensation commands from a network node;
determine, after an update to a location or a velocity of the UE, a closed-loop frequency pre-compensation and an open-loop frequency pre-compensation, wherein:
the closed-loop frequency pre-compensation is determined based at least in part on the one or more frequency pre-compensation commands, and
the open-loop frequency pre-compensation is determined based at least in part on the update to the location or the velocity of the UE; and
transmit, after the update to the location or the velocity of the UE, an uplink signal using a frequency pre-compensation that is based at least in part on the closed-loop frequency pre-compensation and the open-loop frequency pre-compensation.

2. The UE of claim 1,
wherein the one or more processors, to determine the closed-loop frequency pre-compensation, are configured to reset the closed-loop frequency pre-compensation to zero.

3. The UE of claim 2,
wherein the closed-loop frequency pre-compensation is reset to zero after the update to the location or the velocity of the UE.

4. The UE of claim 2,
wherein the closed-loop frequency pre-compensation is reset to zero based at least in part on one or more of a change to the location of the UE satisfying a first threshold, a change to the velocity of the UE satisfying a second threshold, or an elapsed time since a most recent reset of the closed-loop frequency pre-compensation satisfying a third threshold.

5. The UE of claim 4,
wherein one or more of the first threshold, the second threshold, or the third threshold are configured in cell-specific or UE-specific signaling.

6. The UE of claim 1,
wherein the one or more processors, to determine the closed-loop frequency pre-compensation and the open-loop frequency pre-compensation, are configured to:

determine that a physical random access channel (PRACH) was previously transmitted using a value for the open-loop frequency pre-compensation that was based on first values for the location and the velocity of the UE;
calculate the open-loop frequency pre-compensation according to the first values for the location and the velocity of the UE and current values for a satellite location and a satellite velocity; and
calculate the closed-loop frequency pre-compensation according to the one or more frequency pre-compensation commands received from the network node.

7. The UE of claim 1,
wherein the one or more processors, to determine the closed-loop frequency pre-compensation and the open-loop frequency pre-compensation, are configured to:
calculate, at a time of the update to the location or the velocity of the UE, a change to the open-loop frequency pre-compensation caused by the update to the location or the velocity of the UE; and
subtract the change to the open-loop frequency pre-compensation from the closed-loop frequency pre-compensation.

8. The UE of claim 1,
wherein the one or more processors, to determine the closed-loop frequency pre-compensation and the open-loop frequency pre-compensation, are configured to:
calculate, at a time of the update to the location or the velocity of the UE, a change to the open-loop frequency pre-compensation caused by the update to the location or the velocity of the UE;
estimate a fraction of the change to the open-loop frequency pre-compensation that has been corrected by the one or more frequency pre-compensation commands received from the network node; and
subtract the estimated fraction of the change to the open-loop frequency pre-compensation from the closed-loop frequency pre-compensation.

9. The UE of claim 1,
wherein the one or more processors are further configured to:
transmit, to the network node, a notification indicating that a global navigation satellite system (GNSS) location update will be performed within a time period; and
receive, from the network node, an indication that control over one or more of the closed-loop frequency pre-compensation or a closed-loop timing advance is suspended based at least in part on the notification.

10. The UE of claim 1,
wherein the one or more processors are further configured to:
transmit, to the network node, a notification indicating that a global navigation satellite system (GNSS) location update will be performed within a time period; and
receive, from the network node, one or more closed-loop timing advance or closed-loop frequency pre-compensation commands that offset a change in a total timing advance or a total frequency pre-compensation caused by the GNSS location update.

11. A method of wireless communication performed by a user equipment (UE), comprising:
receiving one or more frequency pre-compensation commands from a network node;

determining, after an update to a location or a velocity of the UE, a closed-loop frequency pre-compensation and an open-loop frequency pre-compensation, wherein:

the closed-loop frequency pre-compensation is determined based at least in part on the one or more frequency pre-compensation commands, and the open-loop frequency pre-compensation is determined based at least in part on the update to the location or the velocity of the UE; and transmitting, after the update to the location or the velocity of the UE, an uplink signal using a frequency pre-compensation that is based at least in part on the closed-loop frequency pre-compensation and the open-loop frequency pre-compensation.

12. The method of claim 11, wherein determining the closed-loop frequency pre-compensation includes resetting the closed-loop frequency pre-compensation to zero.

13. The method of claim 12, wherein the closed-loop frequency pre-compensation is reset to zero after the update to the location or the velocity of the UE.

14. The method of claim 12, wherein the closed-loop frequency pre-compensation is reset to zero based at least in part on one or more of a change to the location of the UE satisfying a first threshold, a change to the velocity of the UE satisfying a second threshold, or an elapsed time since a most recent reset of the closed-loop frequency pre-compensation satisfying a third threshold.

15. The method of claim 14, wherein one or more of the first threshold, the second threshold, or the third threshold are configured in cell-specific or UE-specific signaling.

16. The method of claim 11, wherein determining the closed-loop frequency pre-compensation and the open-loop frequency pre-compensation includes:

determining that a physical random access channel (PRACH) was previously transmitted using a value for the open-loop frequency pre-compensation that was based on first values for the location and the velocity of the UE;

calculating the open-loop frequency pre-compensation according to the first values for the location and the velocity of the UE and current values for a satellite location and a satellite velocity; and calculating the closed-loop frequency pre-compensation according to the one or more frequency pre-compensation commands received from the network node.

17. The method of claim 11, wherein determining the closed-loop frequency pre-compensation and the open-loop frequency pre-compensation includes:

calculating, at a time of the update to the location or the velocity of the UE, a change to the open-loop frequency pre-compensation caused by the update to the location or the velocity of the UE; and subtracting the change to the open-loop frequency pre-compensation from the closed-loop frequency pre-compensation.

18. The method of claim 11, wherein determining the closed-loop frequency pre-compensation and the open-loop frequency pre-compensation includes:

calculating, at a time of the update to the location or the velocity of the UE, a change to the open-loop frequency pre-compensation caused by the update to the location or the velocity of the UE;

estimating a fraction of the change to the open-loop frequency pre-compensation that has been corrected by the one or more frequency pre-compensation commands received from the network node; and subtracting the estimated fraction of the change to the open-loop frequency pre-compensation from the closed-loop frequency pre-compensation.

19. The method of claim 11, further comprising:

transmitting, to the network node, a notification indicating that a global navigation satellite system (GNSS) location update will be performed within a time period; and receiving, from the network node, an indication that control over one or more of the closed-loop frequency pre-compensation or a closed-loop timing advance is suspended based at least in part on the notification.

20. The method of claim 11, further comprising:

transmitting, to the network node, a notification indicating that a global navigation satellite system (GNSS) location update will be performed within a time period; and receiving, from the network node, one or more closed-loop timing advance or closed-loop frequency pre-compensation commands that offset a change in a total timing advance or a total frequency pre-compensation caused by the GNSS location update.

21. A network node, comprising:

one or more memories; and one or more processors, coupled to the one or more memories, configured to:

transmit one or more frequency pre-compensation commands to a user equipment (UE); and receive, after an update to a location or a velocity of the UE, an uplink signal using a frequency pre-compensation that is based at least in part on a closed-loop frequency pre-compensation and an open-loop frequency pre-compensation, wherein:

the closed-loop frequency pre-compensation is based at least in part on the one or more frequency pre-compensation commands, and the open-loop frequency pre-compensation is based at least in part on the update to the location or the velocity of the UE.

22. The network node of claim 21, wherein the one or more processors are further configured to:

receive, from the UE, a notification indicating that a global navigation satellite system (GNSS) location update will be performed within a time period; and transmit, to the UE, an indication that control over one or more of the closed-loop frequency pre-compensation or a closed-loop timing advance is suspended based at least in part on the notification.

23. The network node of claim 21, wherein the one or more processors are further configured to:

receive, from the UE, a notification indicating that a global navigation satellite system (GNSS) location update will be performed within a time period; and transmit, to the UE, one or more closed-loop timing advance or closed-loop frequency pre-compensation commands that offset a change in a total timing advance or a total frequency pre-compensation caused by the GNSS location update.

24. The network node of claim 21, wherein the closed-loop frequency pre-compensation is reset to zero after the update to the location or the velocity of the UE.

25. The network node of claim 21, wherein the closed-loop frequency pre-compensation is reset to zero based at least in part on one or more of a change to the location of the UE satisfying a first threshold, a change to the velocity of the UE satisfying a second threshold, or an elapsed time since a most recent reset of the closed-loop frequency pre-compensation satisfying a third threshold.

26. A method of wireless communication performed by a network node, comprising:

transmitting one or more frequency pre-compensation commands to a user equipment (UE); and receiving, after an update to a location or a velocity of the UE, an uplink signal using a frequency pre-compensation that is based at least in part on a closed-loop frequency pre-compensation and an open-loop frequency pre-compensation, wherein:

the closed-loop frequency pre-compensation is based at least in part on the one or more frequency pre-compensation commands, and the open-loop frequency pre-compensation is based at least in part on the update to the location or the velocity of the UE.

27. The method of claim 26, further comprising:

receiving, from the UE, a notification indicating that a global navigation satellite system (GNSS) location update will be performed within a time period; and transmitting, to the UE, an indication that control over one or more of the closed-loop frequency pre-compensation or a closed-loop timing advance is suspended based at least in part on the notification.

28. The method of claim 26, further comprising:

receiving, from the UE, a notification indicating that a global navigation satellite system (GNSS) location update will be performed within a time period; and transmitting to the UE, one or more closed-loop timing advance or closed-loop frequency pre-compensation commands that offset a change in a total timing advance or a total frequency pre-compensation caused by the GNSS location update.

29. The method of claim 26, wherein the closed-loop frequency pre-compensation is reset to zero after the update to the location or the velocity of the UE.

30. The method of claim 26, wherein the closed-loop frequency pre-compensation is reset to zero based at least in part on one or more of a change to the location of the UE satisfying a first threshold, a change to the velocity of the UE satisfying a second threshold, or an elapsed time since a most recent reset of the closed-loop frequency pre-compensation satisfying a third threshold.

* * * * *